(12) United States Patent
Martinez et al.

(10) Patent No.: US 10,199,172 B2
(45) Date of Patent: Feb. 5, 2019

(54) SELF SHIELDING COAXIAL CAPACITOR STRUCTURES

(71) Applicant: Apple Inc., Cupertino, CA (US)

(72) Inventors: Paul A. Martinez, Cupertino, CA (US); Jason C. Sauers, Cupertino, CA (US); Cheung-Wei Lam, San Jose, CA (US); Federico P. Centola, San Jose, CA (US); Andro Radchenko, San Jose, CA (US); Martin Schauer, Fremont, CA (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 15/275,372

(22) Filed: Sep. 24, 2016

(65) Prior Publication Data

US 2017/0207028 A1    Jul. 20, 2017

Related U.S. Application Data

(60) Provisional application No. 62/280,047, filed on Jan. 18, 2016.

(51) Int. Cl.
| | |
|---|---|
| *H01G 4/35* | (2006.01) |
| *H01G 4/30* | (2006.01) |
| *H01G 4/012* | (2006.01) |
| *H01G 4/232* | (2006.01) |
| *H01G 4/12* | (2006.01) |
| *H01G 4/008* | (2006.01) |

(52) U.S. Cl.
CPC ............... *H01G 4/35* (2013.01); *H01G 4/008* (2013.01); *H01G 4/012* (2013.01); *H01G 4/1209* (2013.01); *H01G 4/232* (2013.01)

(58) Field of Classification Search
None
See application file for complete search history.

(56) References Cited

U.S. PATENT DOCUMENTS

| 4,247,881 | A | * | 1/1981 | Coleman | ............... H01G 4/35 361/302 |
| 5,333,095 | A | * | 7/1994 | Stevenson et al. | ...... H01G 4/35 361/302 |
| 5,751,539 | A | * | 5/1998 | Stevenson et al. | ...... H01G 4/35 361/302 |
| 5,905,627 | A | * | 5/1999 | Brendel et al. | .......... H01G 4/35 361/302 |

(Continued)

*Primary Examiner* — Dion Ferguson
(74) *Attorney, Agent, or Firm* — Fletcher Yoder PC

(57) ABSTRACT

Methods and devices related to fabrication and utilization of multilayer capacitors presenting coaxially arranged electrode layers. The capacitors may be self-shielded against electromagnetic interference with neighboring components. The capacitors may have reduced losses from fringing effects when compared to conventional capacitors. The coaxial capacitors may be two-terminal multilayer ceramic capacitors (MLCC). The design of the capacitors may facilitate an improved relationship between the electric and magnetic fields generated by the capacitor within the dielectric in some embodiments. In some embodiments, the placement of the terminals may lead to a cancelation of mutual inductances between the electrodes. Terminations that facilitate the coupling of the capacitor to a circuit board, as well as methods for fabrication of the capacitors are also discussed.

18 Claims, 17 Drawing Sheets

(56) References Cited

U.S. PATENT DOCUMENTS

| | | | |
|---|---|---|---|
| 7,684,170 B2 | 3/2010 | Heyen et al. | |
| 9,524,827 B2* | 12/2016 | Choi | H01G 4/30 |
| 9,627,136 B2* | 4/2017 | Nishisaka et al. | H01G 4/2325 |
| 9,786,437 B1* | 10/2017 | Trinh et al. | H01G 4/35 |
| 2002/0175782 A1* | 11/2002 | Trinh et al. | H03H 7/01 333/182 |
| 2003/0007310 A1* | 1/2003 | Trinh et al. | H01G 4/35 361/302 |
| 2004/0233016 A1* | 11/2004 | Devoe et al. | H03H 7/01 333/182 |
| 2008/0080210 A1* | 4/2008 | Togashi | H01G 4/30 361/301.4 |
| 2014/0160622 A1* | 6/2014 | Chung et al. | H05K 1/0231 361/301.4 |
| 2015/0255216 A1* | 9/2015 | Mishra et al. | H01G 4/35 361/302 |
| 2015/0310990 A1 | 10/2015 | Mishra et al. | |

\* cited by examiner

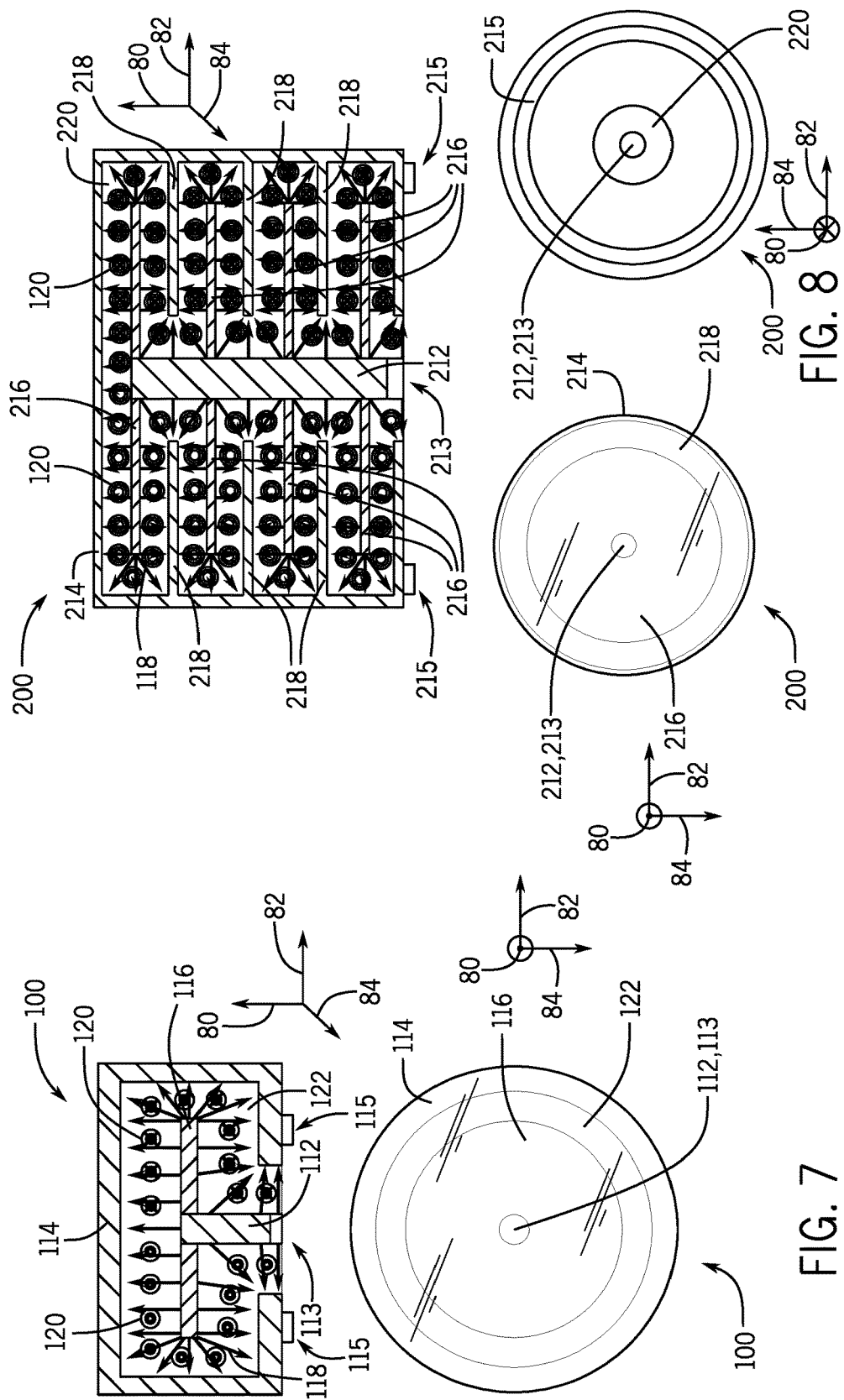

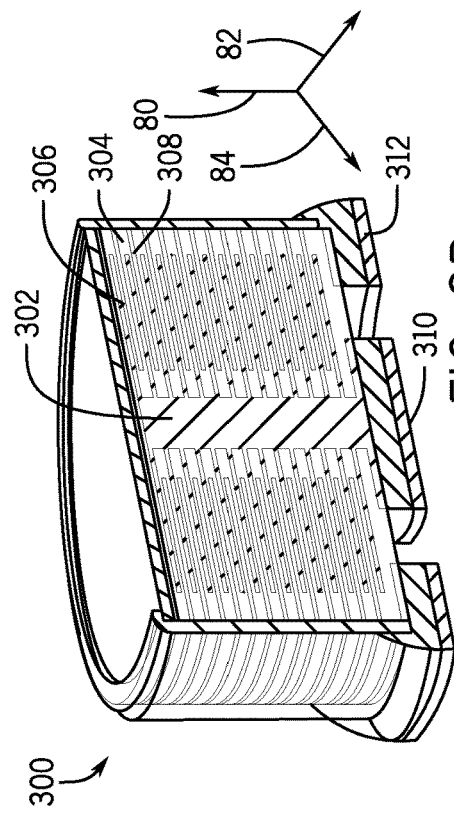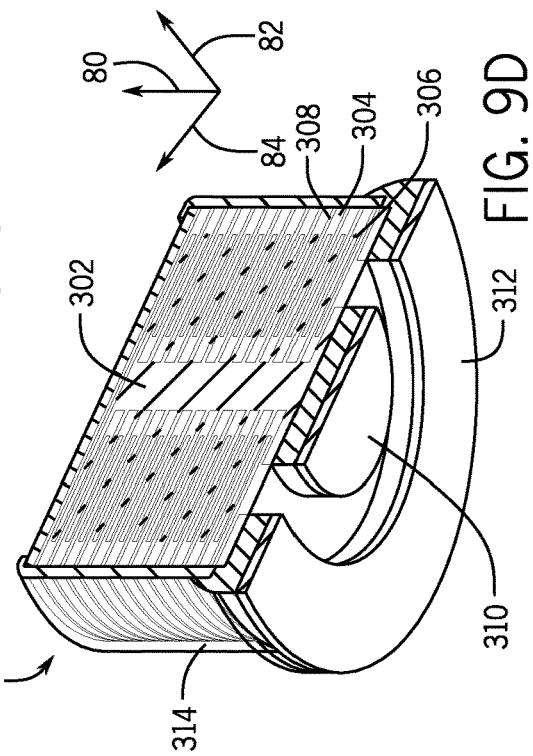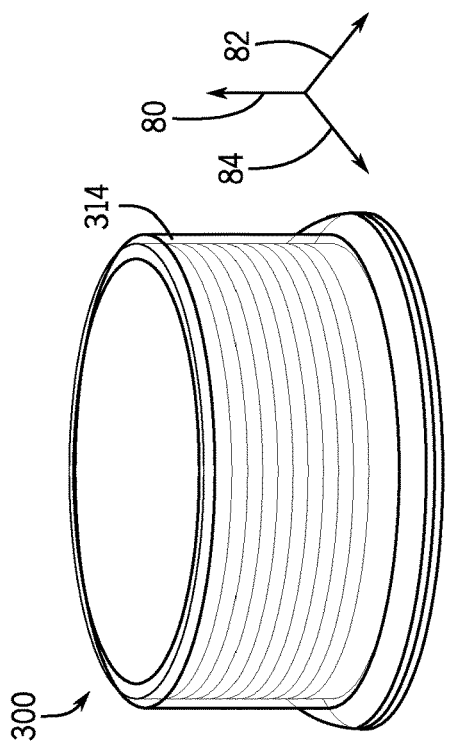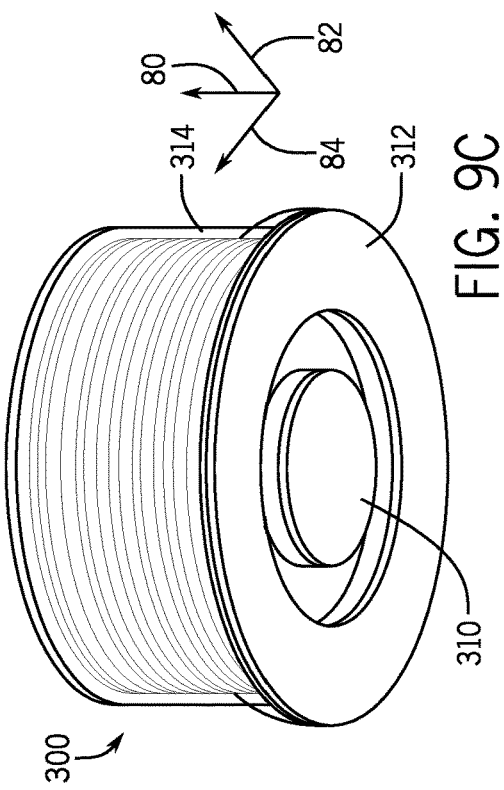

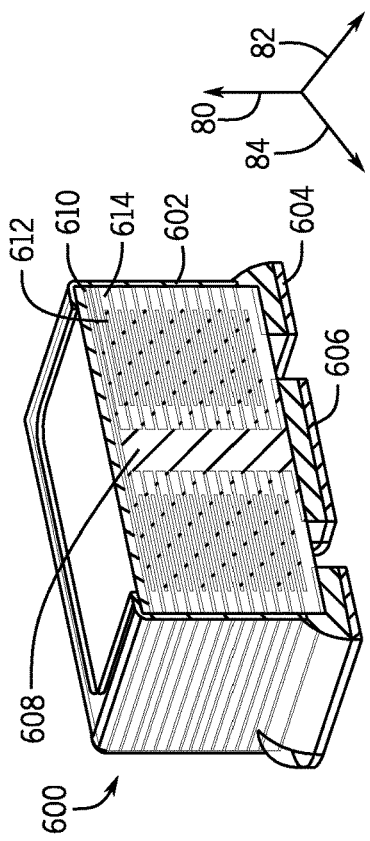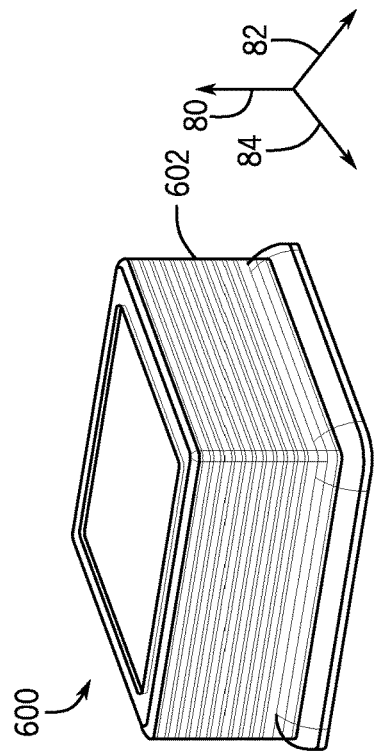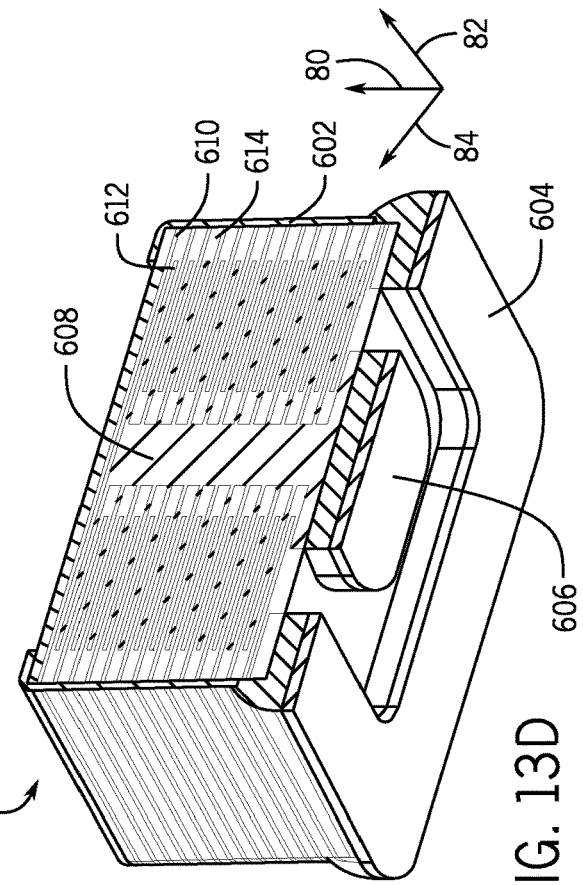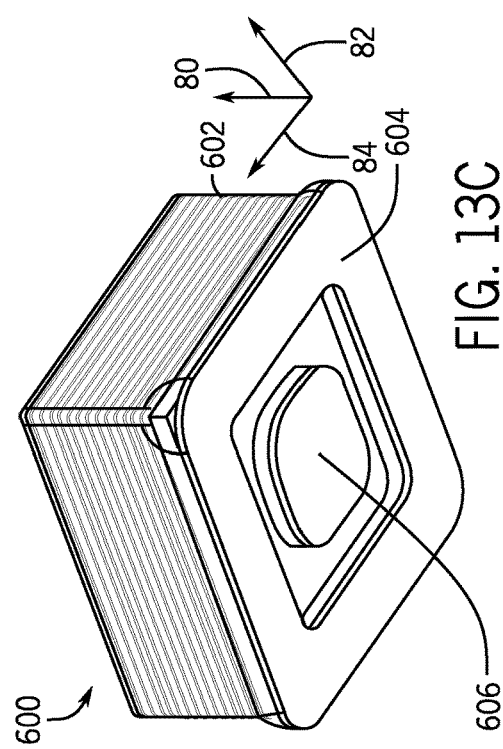

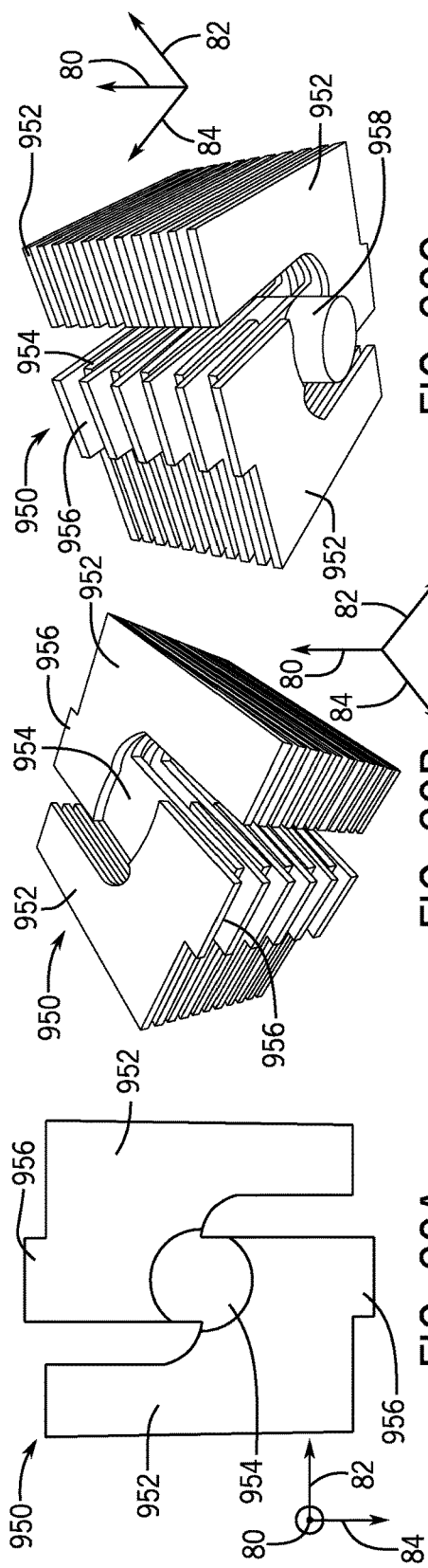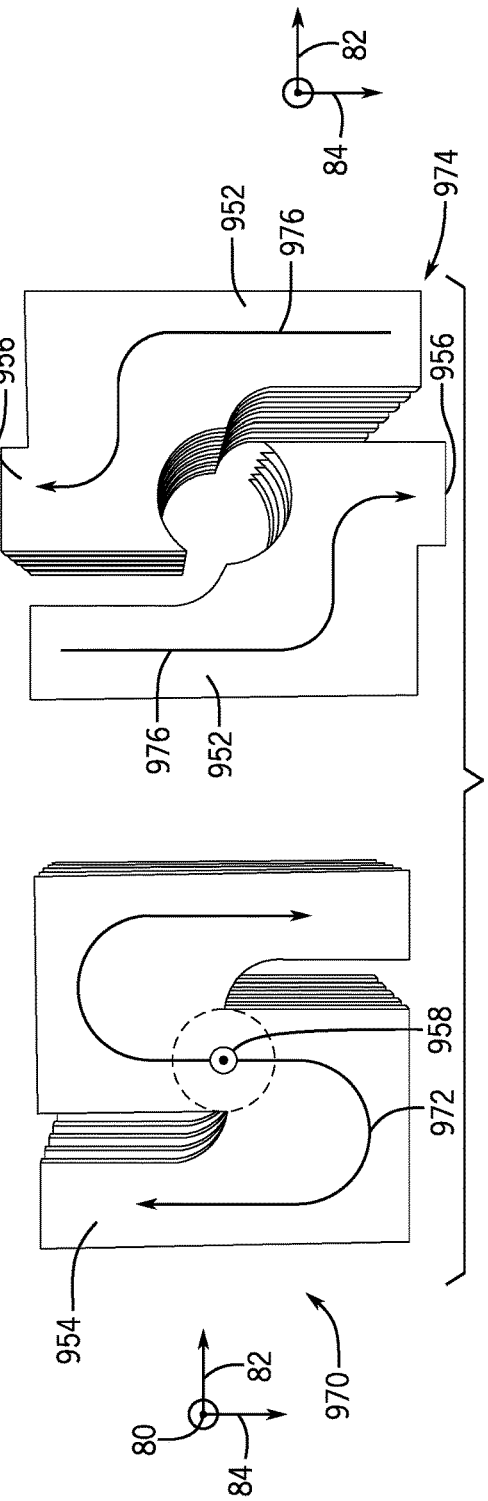
FIG. 20A
FIG. 20B
FIG. 20C
FIG. 21

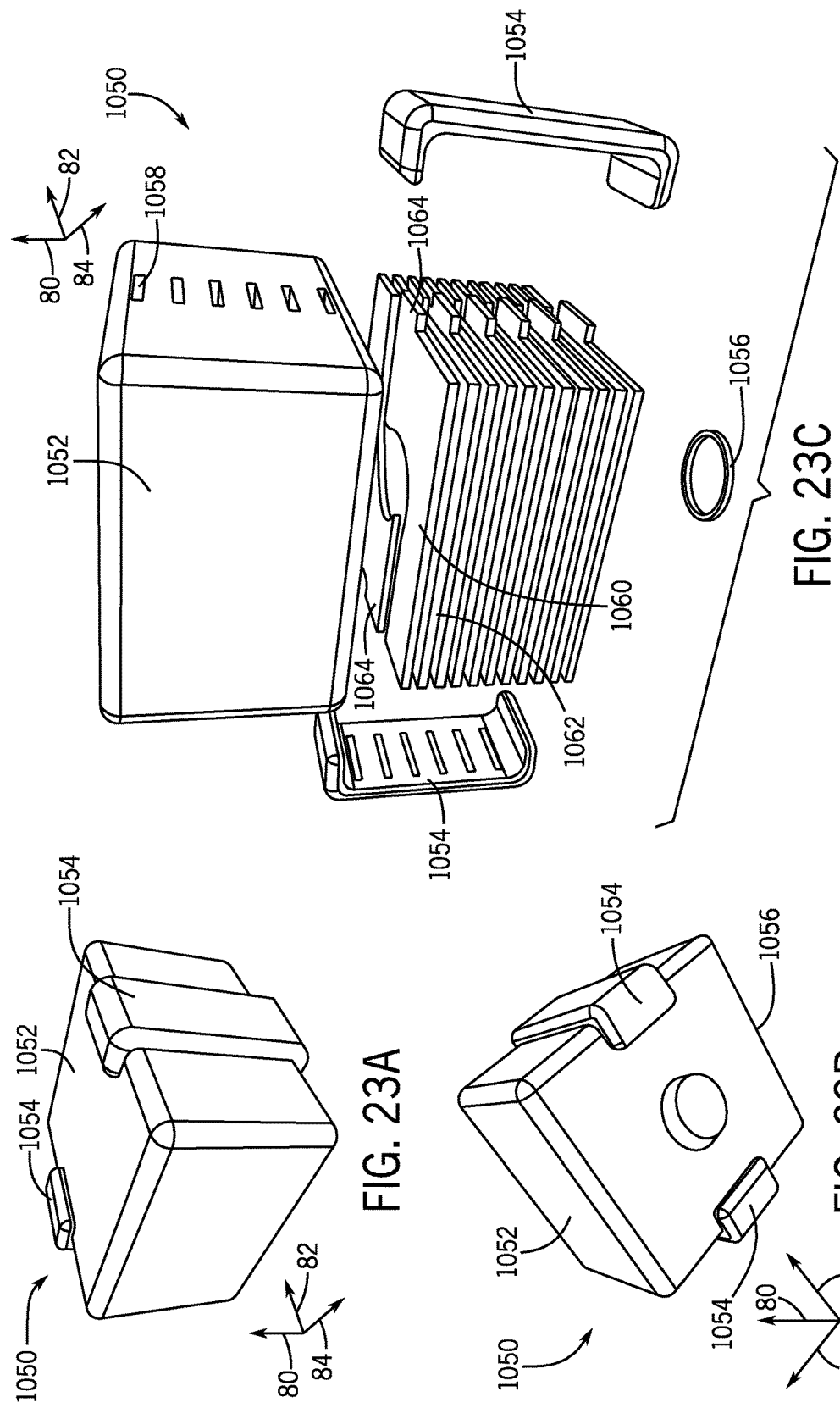

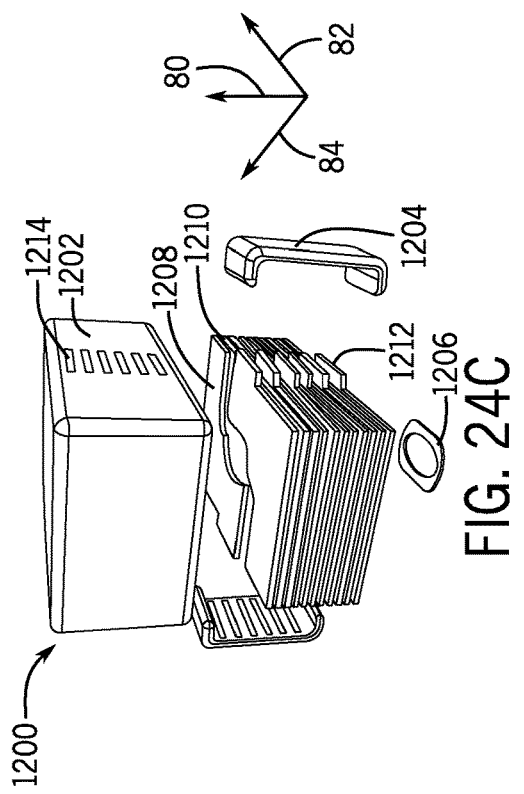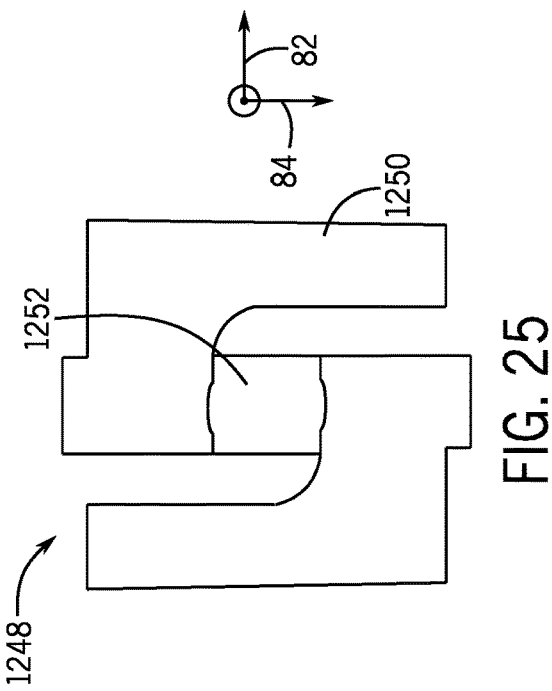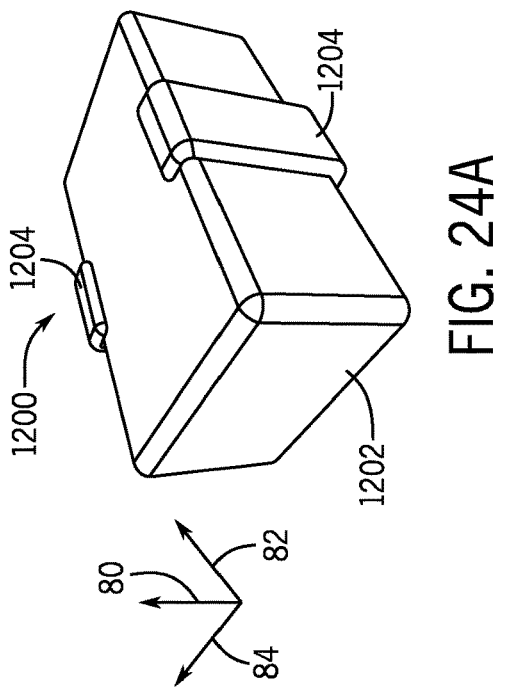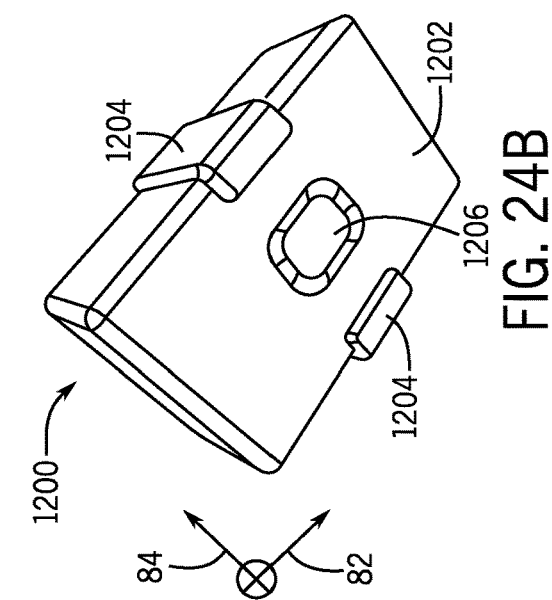

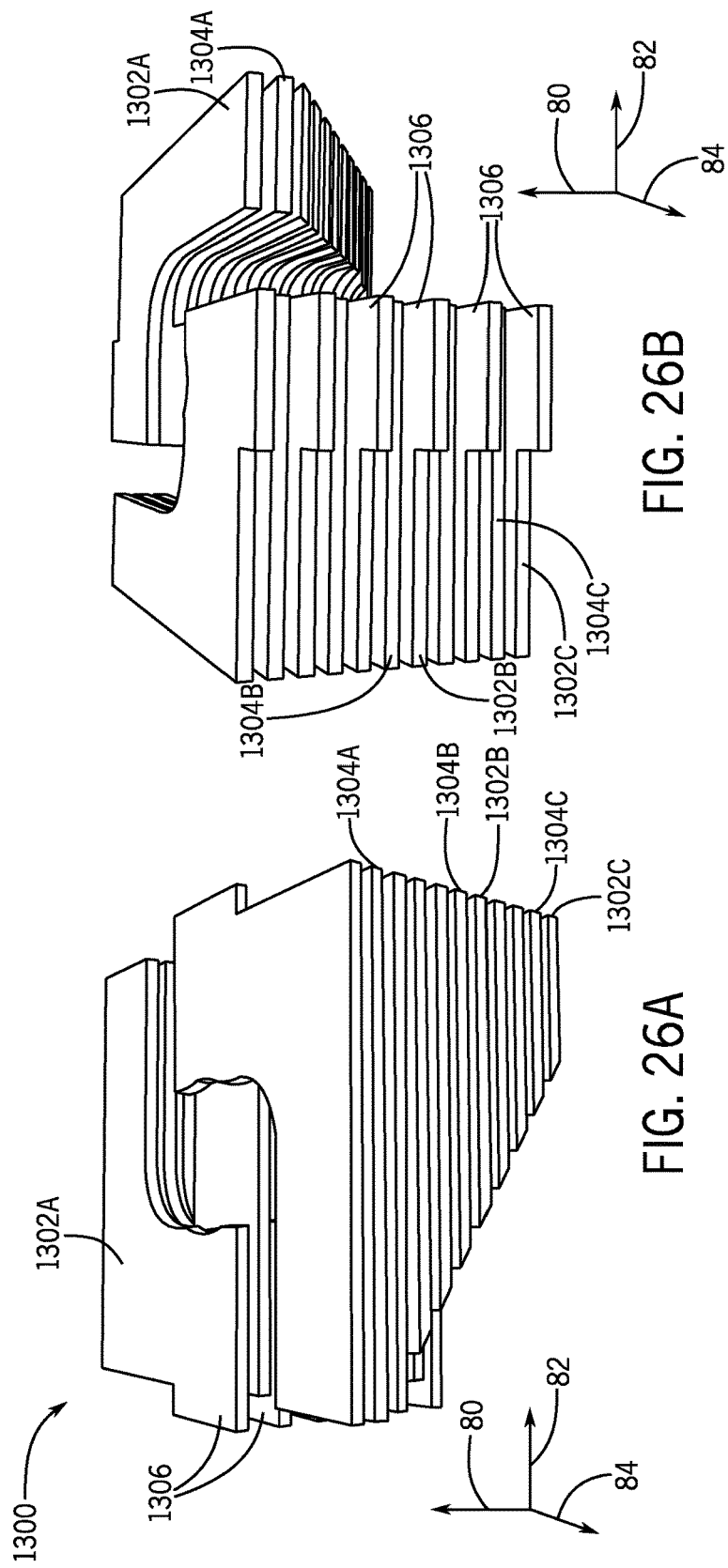

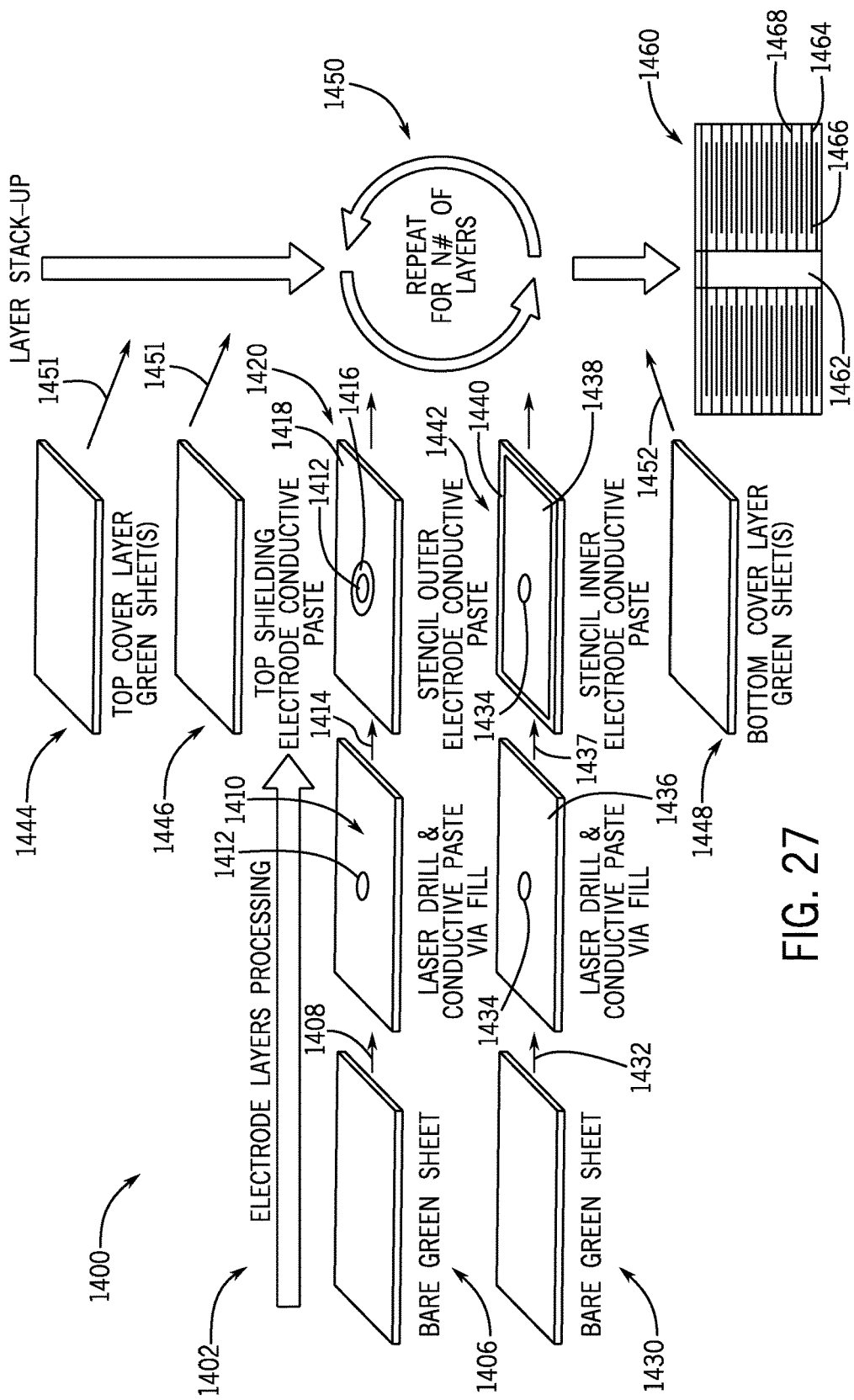

SELF SHIELDING COAXIAL CAPACITOR STRUCTURES

CROSS-REFERENCE TO RELATED APPLICATIONS

This application claims the benefit of U.S. Provisional Application No. 62/280,047 entitled "High Q Coaxial Capacitor Structure" filed on Jan. 18, 2016, which is incorporated by reference herein its entirety for all purposes.

BACKGROUND

The present disclosure relates generally to methods and systems related to the fabrication and use of self-shielding capacitor structures. More specifically, the disclosure discusses multilayer capacitor structures that employ coaxial electrode layers that may improve the geometric arrangement of the electrical and/or magnetic fields generated during operation of the capacitor, resulting in improved performance of the capacitor in high frequency circuit applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Capacitors are often used in circuits designed for high frequency applications, such as in circuits for wireless radio frequency (RF) application, impedance matching circuits, filters, resonator circuits, precision tank circuits, decoupling circuits, and other known applications. Some capacitors, such as multilayer ceramic capacitors, usually do not have shielding against electromagnetic interference. As a result, capacitors employed in high-frequency circuit applications may suffer electromagnetic interference from neighboring electrical components or devices. Moreover, the capacitors themselves may also cause electromagnetic interference in neighboring electrical components or devices that result in decreased performance of the circuit.

Furthermore, capacitors used in these high frequency systems may suffer from losses within the device due to fringing effects and other losses within the dielectric. To mitigate these issues, some capacitors are fabricated using high conductivity electrodes and low loss dielectrics. However, this solution may have limited application in the construction of multilayer ceramic capacitors (MLCC) for high frequency applications.

BRIEF DESCRIPTION

In one embodiment, a capacitor is provided. The capacitor may include a set of layers with outer electrodes that may be coupled to a first terminal of the capacitor and at least one layer disposed between two layers of the first set of layers, whereby the at least one layer includes an inner electrode coupled to a second terminal through an inner conductor. The shapes of each outer electrode and the shape of the inner electrode may be coaxially arranged such that, upon application of a voltage between the first and the second terminal, the magnetic fields generated encircle the inner conductor.

In a second embodiment, another capacitor is provided having a layered stack of electrodes. The capacitor may also have a first electrical terminal located in a specific location of the capacitor (e.g., a central region of the capacitor) that may be coupled to a first set of electrodes. The capacitor may also have a second electrical terminal disposed in a second location of the capacitor (e.g., a point in the boundary of the capacitor) and may be coupled to a second set of electrodes. Upon an application of a positive voltage between the first terminal and the second terminal, a first set of electrical currents may flow from the first terminal into the first set of electrodes and a second set of electrical currents may flow from the second set of electrodes towards the second terminal in a direction anti-parallel to the flow of the first set of electrical currents.

In a further embodiment, a method to produce a multilayer capacitor is discussed. The method may produce a first layer containing a first electrode from a sheet by drilling an aperture, filling the aperture with a conductive material to form a central conductor, and stenciling the first electrode physically isolated from the central conductor. A second layer, containing a second electrode, may be produced from a sheet by drilling an aperture in the sheet, filling with a conductive material to form a central conductor, and stenciling the electrode such that the electrode is physically connected to the central conductor. The layers may be stacked such that the central conductor portion of the first layer and the central conductor portion of the second layer are coupled.

Embodiments discussed in the application may provide self-shielding capacitors and/or capacitor structures that may include coaxially arranged electrodes. Some embodiments may be multilayer ceramic capacitors presenting a vertical pillar along a central axis, and with electrodes that may be coaxial with the vertical pillar. Moreover, in some embodiments, the location of the electrical coupling between a terminal and the electrodes may be arranged such that the mutual inductances generated by an electrode during operation of the capacitor may be cancelled by the mutual inductances generated by an adjacent electrode. As a result of these arrangements, magnetic fields generated during operation of the capacitor may circumscribe the vertical pillar and may remain within the dielectric leading to a self-shielding property for the capacitor structure. The cancellation of the mutual inductances may further reduce the fringe losses and mitigate parasitic capacitances in the capacitor structure.

BRIEF DESCRIPTION OF THE DRAWINGS

Various aspects of this disclosure may be better understood upon reading the following detailed description and upon reference to the drawings in which:

FIG. 7 presents a side and a bottom view of a cylindrical, self-shielding, coaxial capacitor structure with a single capacitive interface that may be used in conjunction with any of the devices of FIGS. 1-6, in accordance with an embodiment;

FIG. 8 presents a side, a bottom and a top view of a multilayer, cylindrical, self-shielding coaxial capacitor structure that may be used in conjunction with any of the devices of FIGS. 1-6, in accordance with an embodiment;

FIGS. 9A-9D present multiple views of a cylindrical, self-shielding, coaxial capacitor structure with terminations that may be used in conjunction with any of the devices of FIGS. 1-6, in accordance with an embodiment;

FIGS. 13A-13D present multiple views of a prismatic, self-shielding coaxial capacitor structure with a squircle footprint, in accordance with an embodiment;

FIGS. 20A-20C present multiple views of a multilayer, coaxial, self-shielding capacitor structure presenting mutual inductance cancelation that may be used in conjunction with any of the devices of FIGS. 1-6, in accordance with an embodiment;

FIG. 21 presents diagrams that illustrate a flow of currents that may be observed in a set of inner electrodes during operation of the capacitor of FIG. 20 and the corresponding flow of currents in the set outer electrodes of the same capacitor, in accordance with an embodiment;

FIGS. 23A-23I present multiple views of a multilayer, coaxial, self-shielding capacitor structure presenting mutual inductance cancelations along with terminations and an enclosure and that may be used in conjunction with any of the devices of FIGS. 1-6, in accordance with an embodiment;

FIGS. 24A-24C present multiple views of a multilayer, coaxial, self-shielding capacitor structure presenting mutual inductance cancelations having a rectangular footprint that may be used in conjunction with any of the devices of FIGS. 1-6, in accordance with an embodiment;

FIG. 25 presents a top view of an alternative multilayer, coaxial, self-shielding capacitor structure presenting mutual inductance cancelations that may be used in conjunction with any of the devices of FIGS. 1-6, in accordance with an embodiment;

FIGS. 26A-26B present perspective views of another multilayer, coaxial, self-shielding capacitor structure presenting mutual inductance cancelations that may be used in conjunction with any of the devices of FIGS. 1-6, in accordance with an embodiment; and FIG. 27 is a flow diagram of a method to produce a coaxial self-shielding capacitor structures, in accordance with an embodiment.

DETAILED DESCRIPTION OF SPECIFIC EMBODIMENTS

Figure 1:
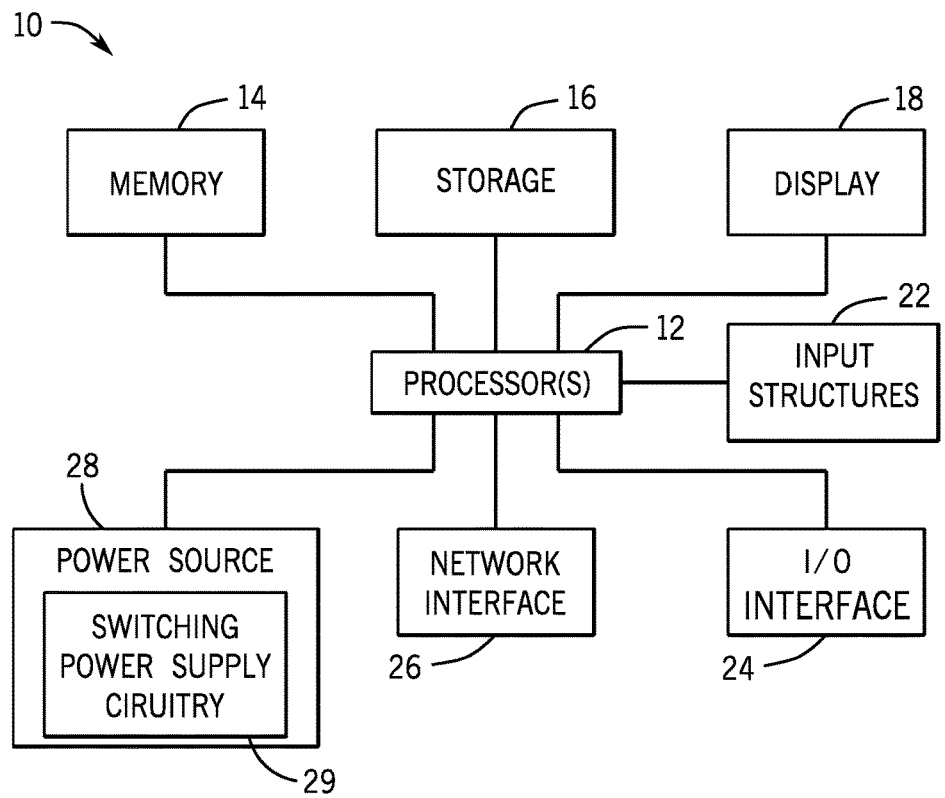
FIG. 1 is a diagram of an electrical device that may benefit from the inclusion of one or more self-shielding capacitor structures, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In some of the descriptions we may employ the terms "coupling" and "connected" between two devices. Terms such as "coupled" and "electrically coupled" are intended to mean that the two devices may form an electrical circuit of some kind while "directly coupled" or "directly connected" is intended to mean that there is a physical connection between the two devices. "Resistively coupled" is intended to mean that the two devices are electrically coupled and that the type of electrical circuit formed between the two devices is substantially a resistive circuit, whereas "capacitively coupled" is intended to mean that there is at least one capacitive interface (e.g., a dielectric capable of storing electric potential) in the circuit. Moreover, expressions such as "coupling through a connector" are intended to mean that the circuit between the two devices include the connector. Terms such as "operably coupled" are intended to mean that the two devices may be coupled in a manner that allows for proper function of the modules.

The disclosed embodiments relate to systems and devices for the design, fabrication, and utilization of self-shielding capacitors structures presenting coaxial electrodes that may produce reduced parasitic capacitances. The capacitors may be ceramic capacitors constructed with techniques such as the ones used in multilayer ceramic capacitors (MLCC) to form electrodes separated by a dielectric. A vertical pillar may be present along a central axis of the capacitor and connected to a subset of electrodes that are physically coupled to a first terminal. As detailed below, some of the capacitors described herein may have electrodes arranged such that the electrical fields generated between the electrodes of distinct polarities stay substantially within the dielectric of the capacitor. Some embodiments of the capacitors may have electrodes coaxially arranged with respect to the central vertical pillar, leading to a generation of magnetic fields within the dielectric that circumscribe the vertical pillar and remain in the dielectric.

Further embodiments may provide capacitors with electrodes arranged such that the currents in electrodes coupled to different terminals of the capacitor may flow in anti-parallel directions, as detailed below. The resulting reduction in mutual inductances from this geometry may further improve the quality of the capacitor, and reduce parasitic capacitances. The arrangements described herein may also decrease fringe losses as the flow of electrical and/or magnetic fields remains substantially within the dielectric of the capacitor during operation of the capacitor, as discussed below in the discussion of the embodiments illustrated in FIGS. 7 and 8. The containment of the electric and/or magnetic fields within the dielectric may also lead to increased shielding properties of the capacitor, as the capacitor, due to its design and operation, may be substantially free from interference caused by electrical/and or magnetic fields generated by neighboring electrical components.

With the preceding in mind, a general description of suitable electronic devices that may include and use the self-shielding coaxial capacitor structures described above is provided. FIG. 1 is a block diagram of an electronic device 10, in accordance with an embodiment of the present disclosure. The electronic device 10 may include, among other things, one or more processor(s) 12, memory 14, storage or nonvolatile memory 16, a display 18, input structures 22, an input/output (I/O) interface 24, network interface 26, and a power source 28 that includes switching power supply circuitry 29. The various functional blocks shown in FIG. 1 may include hardware elements (including circuitry), software elements (including computer code stored on a computer-readable medium), or a combination of both hardware and software elements. Embodiments of the capacitor structure described herein may be used in the circuitry of the various functional blocks of FIG. 1 to improve a performance of software and hardware elements. It should be noted that FIG. 1 is merely one example of a particular implementation and is intended to illustrate the types of components that may be present in electronic device 10.

Figure 2:
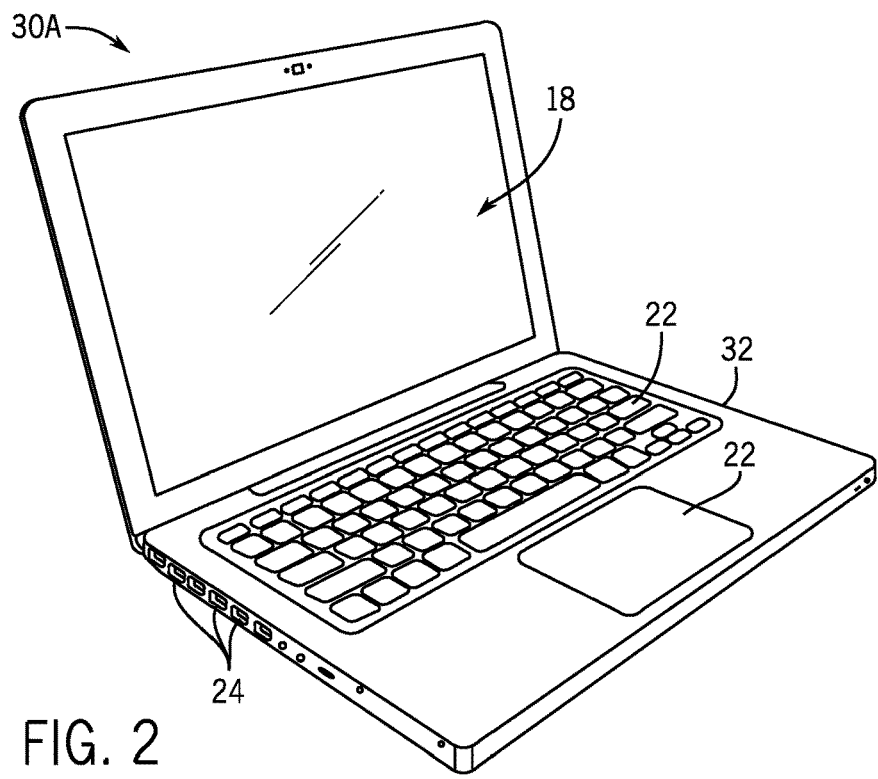
FIG. 2 is a perspective view of a notebook computer that may benefit from the inclusion of one or more self-shielding capacitor structures, in accordance with an embodiment.
Figure 4:
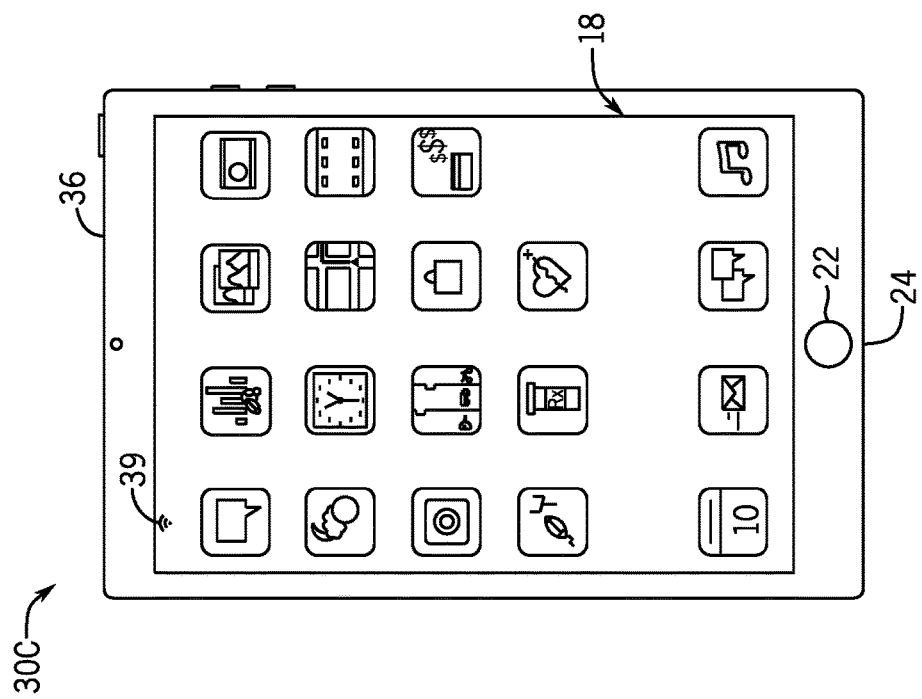
FIG. 4 is a front view of portable tablet computer that may benefit from the inclusion of one or more self-shielding capacitor structures, in accordance with an embodiment.
Figure 3:
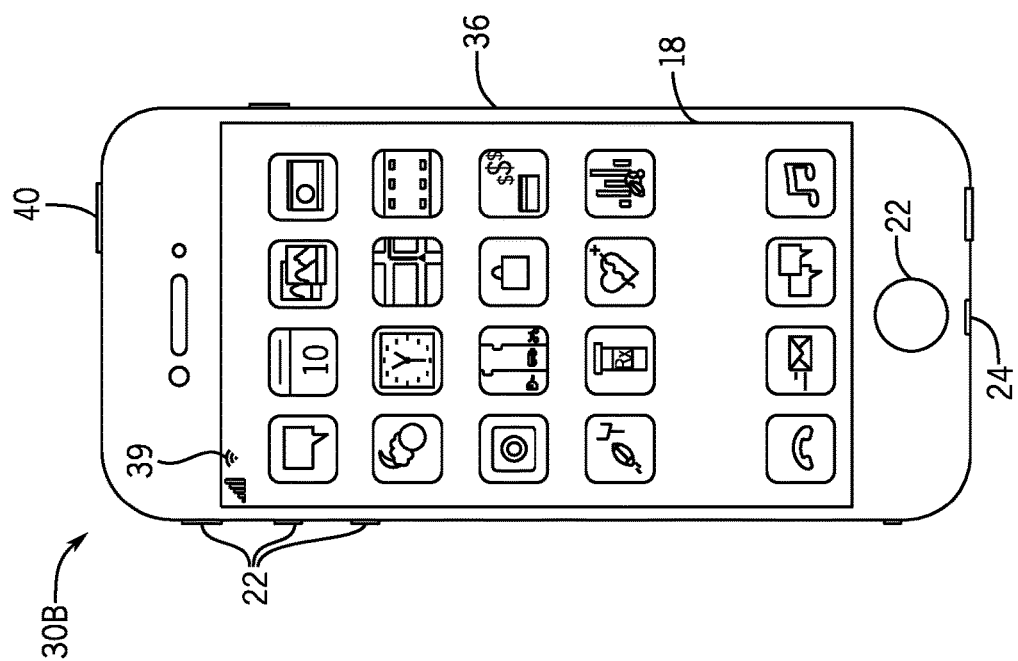
FIG. 3 is a front view of a hand-held device that may benefit from the inclusion of one or more self-shielding capacitor structures, in accordance with an embodiment.
Figure 5:
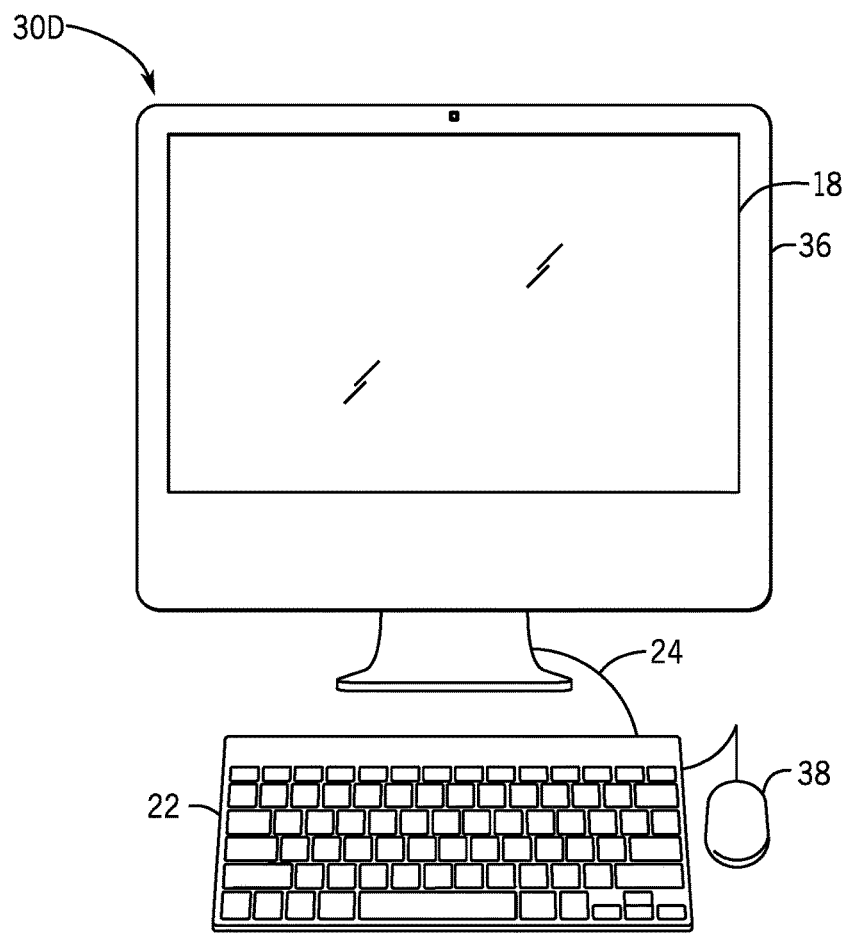
FIG. 5 is a diagram of a desktop computer that may benefit from the inclusion of one or more self-shielding capacitor structures, in accordance with an embodiment.
Figure 6:
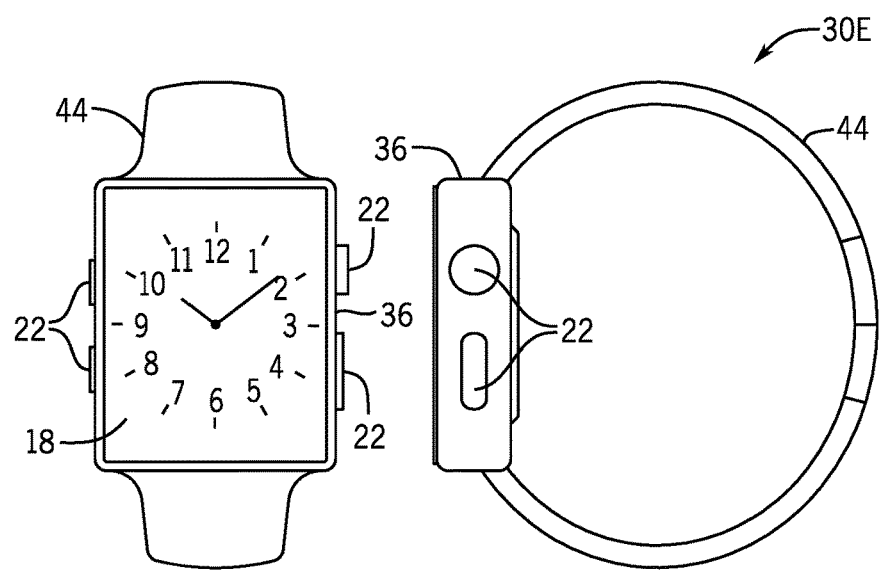
FIG. 6 presents a front and a side view of a wearable electrical device that may benefit from the inclusion of one or more self-shielding capacitor structures, in accordance with an embodiment.

By way of example, the electronic device 10 may represent a block diagram of a notebook computer 30A depicted in FIG. 2, handheld devices 30B, 30C depicted in FIG. 3 and FIG. 4, a desktop computer 30D depicted in FIG. 5, a wearable electronic device 30E depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture or computer program product that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Moreover, programs (e.g., an operating system) encoded on the memory 14 or the nonvolatile storage 16 may also include instructions that may be executed by the processor(s) 12 to allow the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED, OLED, AMOLED, etc.) displays, or some combination of LCD panels and LED panels.

The input structures 22 of the electronic device 10 may allow a user to interact with the electronic device 10 (e.g., pressing a button to increase or decrease a volume level). The I/O interface 24 may allow electronic device 10 to interface with various other electronic devices. The I/O interface 24 may include various communications interfaces, such as universal serial bus (USB) ports, serial communications ports (e.g., RS232), Apple's Lightning® connector, or other communications interfaces. The network interface 26 may also allow electronic device 10 to interface with various other electronic devices and may include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The network interface 26 may include an interface for, for example, broadband fixed wireless access networks (e.g., WiMAX), mobile broadband Wireless networks (e.g., mobile WiMAX), asynchronous digital subscriber lines (e.g., ADSL, VDSL), digital video broadcasting-terrestrial (DVB-T) and its extension DVB Handheld (DVB-H), Ultra-Wideband (UWB), alternating current (AC) power lines, and so forth.

In some applications, input structures 22, the I/O interfaces 24 and/or network interfaces 26 may employ radiofrequency (RF) circuitry modules, such as high performance impedance matching circuits, resonator circuits, precision tank circuits, and other related modules that may be beneficial in wireless communication. These applications may benefit from the use of capacitors with reduced fringe losses, such as the MLCC structures described herein.

As further illustrated, the electronic device 10 may include a power source 28. The power source 28 may include any suitable source of power, such as a rechargeable lithium polymer (e.g., Li-poly) battery and/or an alternating current (e.g., AC) power converter. The power source 28 may be removable, such as replaceable battery cell. The power source 28 may also include or be coupled to the switching power supply circuitry 29, which may be used to store and converting energy of the electronic device 10. As will be discussed further below, the switching power supply circuitry 29 may include self-shielding coaxial capacitor structures.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of the notebook computer 30A, is illustrated in FIG. 2 in accordance with an embodiment of the present disclosure. The depicted computer 30A may include a housing or enclosure 32, a display 18, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents an embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif. FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

The handheld devices 30B and 30C may each include similar components. For example, an enclosure 36 may protect interior components from physical damage. Enclosure 36 may also shield the handheld devices 30B and 30C from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal service bus (e.g., USB), one or more conducted radio frequency connectors, or other connectors and protocols.

User input structures 22, 40, in combination with the display 18, may allow a user to control the handheld devices 30B or 30C. For example, the input structure 40 may activate or deactivate the handheld device 30B or 30C, one of the input structures 22 may navigate a user interface of the handheld device 30B or 30C to a home screen, a user-configurable application screen, and/or activate a voice-recognition feature of the handheld device 30B or 30C, while other of the input structures 22 may provide volume control, or may toggle between vibrate and ring modes. In the case of the handheld device 30B, additional input structures 22 may also include a microphone may obtain a user's voice for various voice-related features, and a speaker to allow for audio playback and/or certain phone capabilities. The input structures 22 may also include a headphone input to provide a connection to external speakers and/or headphones.

Turning to FIG. 5, a computer 30D may represent another embodiment of the electronic device 10 of FIG. 1. The computer 30D may take any suitable form of computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as a dual-layer display. In certain embodiments, a user of the computer 30D may interact with the computer 30D using various peripheral input devices, such as input structures 22 (e.g., the keyboard or mouse 38), which may connect to the computer 30D via a wired I/O interface 24 and/or wireless I/O interface.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 44, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, OLED display, active-matrix organic light emitting diode (e.g., AMOLED) display, and so forth), which may allow users to interact with a user interface of the wearable electronic device 30E.

In the figures illustrating embodiments of the capacitor, such as FIG. 7, reference may be made to directions and orientations of structures of the capacitor. In some embodiments, a vertical direction 80 may refer to a direction perpendicular to a horizontal plane formed by a horizontal direction 82, and a transversal direction 84. When referring to certain embodiments presenting coaxial capacitor structures, the coaxial shape may refer to an axis that may be parallel to the vertical direction 80. Moreover, in certain embodiments, the electrode surfaces may be parallel to the horizontal plain formed by the horizontal direction 82 and the transversal direction 84. In embodiments where the capacitor may be coupled (e.g., mounted) to a printed circuit board (PCB), the horizontal plane formed by horizontal direction 82 and transversal direction 84 may be parallel to the mounting surface of the PCB.

With the foregoing in mind, FIG. 7 illustrates an embodiment of a self-shielding coaxial capacitor 100 that may be used in the circuitry of the devices discussed above. The capacitor 100 includes a vertical pillar 112 (e.g., a pillar in the vertical direction 80) coupled to a first terminal 113 of the capacitor 100 and a casing structure 114 coupled to a second terminal 115 of the capacitor 100. An inner electrode 116 may be physically connected to a vertical pillar 112. In capacitor 100 the vertical pillar 112 and the inner electrode 116 may form a capacitive interface with casing structure 114, which forms an outer electrode for capacitor 100. A dielectric 122 may be disposed between inner electrode 116 and casing structure 114. In multilayer ceramic capacitors, the dielectric 122 may be formed by sheets of ceramic material, the inner electrode 116 may be formed by shapes stenciled in the sheets of ceramic material with a conductor material, and the vertical pillar may be formed by holes in the sheets of ceramic material filled with a conductor material, as detailed below.

If an alternating current (AC) signal is applied between the first terminal 113 and the second terminal 115 of the capacitor, through a time-varying electrical potential (e.g., voltage) time-varying electrical fields, represented by electrical field arrows 118, and time-varying magnetic fields, represented by magnetic field arrows 120, may be generated within the dielectric 122. Note that, due to the encapsulation of the inner electrode 116 within casing structure 114, the electric fields represented by arrows 118 are entirely contained within the dielectric 122. That is, no electric field arrows 118 flow from the inner electrode 116 to casing 114 and leaves the dielectric 122. The effect illustrated in FIG. 7 provides to capacitor 100 the ability to not perturb (e.g., influence) significantly any electrical field outside the capacitor.

Moreover, in systems where an AC signal may be applied, between the terminals 113 and 115, time-varying electrical fields arrows 118 formed within the dielectric 122 may generate time-varying magnetic fields arrows 120 perpendicular to the electrical fields. Since the electrical field arrows 118 are contained within dielectric 122, the magnetic fields arrows 120 are also contained in the dielectric 122. Moreover, due to relative position of inner electrode 116 relative to casing structure 114, the magnetic fields (represented by magnetic field arrows 120) generated circumscribe the vertical pillar 112 and may reside in the plane formed by horizontal direction 82 and transversal direction 84. The substantial containment of the electrical and magnetic fields within the dielectric 122 may lead to the capacitor 100 being self-shielding. Moreover, since most of the interactions between the generated magnetic fields and electrical fields occur within a single dielectric 122 (i.e., no substantial interaction between magnetic and electrical fields takes place outside the capacitor), the capacitor 100 may present an improved relationship between the electrical field arrows 118 and the magnetic field arrows 120. For example, the relationship between electrical fields and magnetic fields in the capacitor 100 may be similar to the relationship between electrical fields and magnetic fields in a coaxial transmission line. The reduced losses that may be obtained from the coaxial-type transmission line model relationship established between the electrical and magnetic fields generated in capacitor 100 may lead to an improvement in the Q factor of the capacitor, measured as the ratio between the capacitive reactance and the series resistance of the capacitor. The improved relationship may also be associated with a decrease in parasitic capacitances occurring within in the circuit (e.g., use of capacitors having the structure described above in place of traditional capacitors may reduce parasitic capacitance in the circuit otherwise attributable to traditional capacitors).

The diagrams in FIG. 8 illustrate another embodiment of a self-shielding coaxial capacitor 200 that contain multiple inner electrodes and outer electrodes to form multiple capacitive interfaces. The capacitor 200 may have a central pillar 212 that may be disposed in a vertical direction 80, and may be coupled to a first terminal 213 of the capacitor 200 and the casing 214 that may be coupled to a second terminal 215 of the capacitor 200. The central pillar 212 may be directly in contact with inner electrodes 216. Each inner electrode 216 may form a capacitive interface with one or more of an outer electrode 218 and/or with the casing 214 through dielectric 220. Capacitive interfaces between central pillar 212 and casing 214 and outer electrode 218 may also appear during operation of capacitor 200. Dielectric 220 may be formed from an insulating ceramic material, as discussed below. The capacitor 200 may be functionally described as the circuit going from the first terminal 213 to the second terminal 215 through central pillar 212, inner electrodes 216, outer electrodes 218, the casing 214, and the capacitive interfaces discussed above may form.

Note that, similar to capacitor 100 of FIG. 7, capacitor 200 is self-shielding, as the electric and/or magnetic fields generated during operation of capacitor 200 may not substantially leave the volume defined by casing 214. For example, the electrical field arrows 118 that represent the electric field and the magnetic field arrows 120 that represent the magnetic field are substantially contained within dielectric 220. As discussed above, the self-shielding (i.e., the containment of the electric and/or magnetic fields within the capacitor 200) is useful as it prevents the capacitor from interfering with neighboring electrical components during the operation. Furthermore, due to this self-shielding property, capacitor 200 is also significantly free from interference from neighboring electrical components during operation. The presence of multiple capacitive interfaces between the inner electrodes 216 and outer electrodes 218 in capacitor 200 may further reduce fringe losses and parasitic capacitances with respect to the single electrode capacitor 100.

Note that both the inner electrodes 216 and outer electrodes 218 are formed from discs that are concentric with respect to the central pillar 212. As a result, the time-varying electric fields and the time-varying magnetic fields that may be generated within capacitor 200 may substantially remain within a single dielectric 220, as illustrated by electric field arrows 118 and magnetic field arrows 120. As discussed above, this characteristic may provide an improved relationship between the electric and the magnetic field, which may be similar to the relationship between magnetic fields and electrical fields in a coaxial transmission line. The improved relationship may lead to an improvement in the Q factor of the capacitor, and a decrease in parasitic capacitance (e.g., use of capacitors having the structure described above in place of traditional capacitors may reduce parasitic capacitance in the circuit otherwise attributable to traditional capacitors).

With the foregoing in mind, we discuss capacitors that may have a termination to facilitate mounting to a PCB. FIGS. 9A-D illustrate an embodiment of a capacitor 300 that may be constructed with a design similar to capacitor 200 of FIG. 8. Capacitor 300 may include a central pillar 302 that is coupled to inner electrodes 306 and outer electrodes 308, which may be coupled to external casing 314. The central pillar 302 may be oriented in a vertical direction 80, and the inner electrodes 306 and outer electrodes 308 may be parallel to the plane formed by horizontal direction 82 and transversal direction 84. Dielectric interfaces, such as the dielectric 304, may form the capacitive connection between inner electrodes 306 and outer electrodes 308. The central pillar 302 may be coupled to a first terminal 310 in the center of the bottom of the capacitor 300. A second terminal 312, coupled to the external casing 314, may be located along an edge of the bottom of the capacitor 300. Note that, as in capacitor 200 of FIG. 8, the inner electrodes 306 and outer electrodes 308 are concentric with respect to the central pillar 302. As a result, the capacitor 300 may mitigate fringe losses due to electrical and/or magnetic fields escaping the dielectric 304, reduce parasitic capacitances when disposed in circuitry such as along a printed circuit board (PCB), and present a better Q factor as compared to conventional capacitors.

Figure 10:
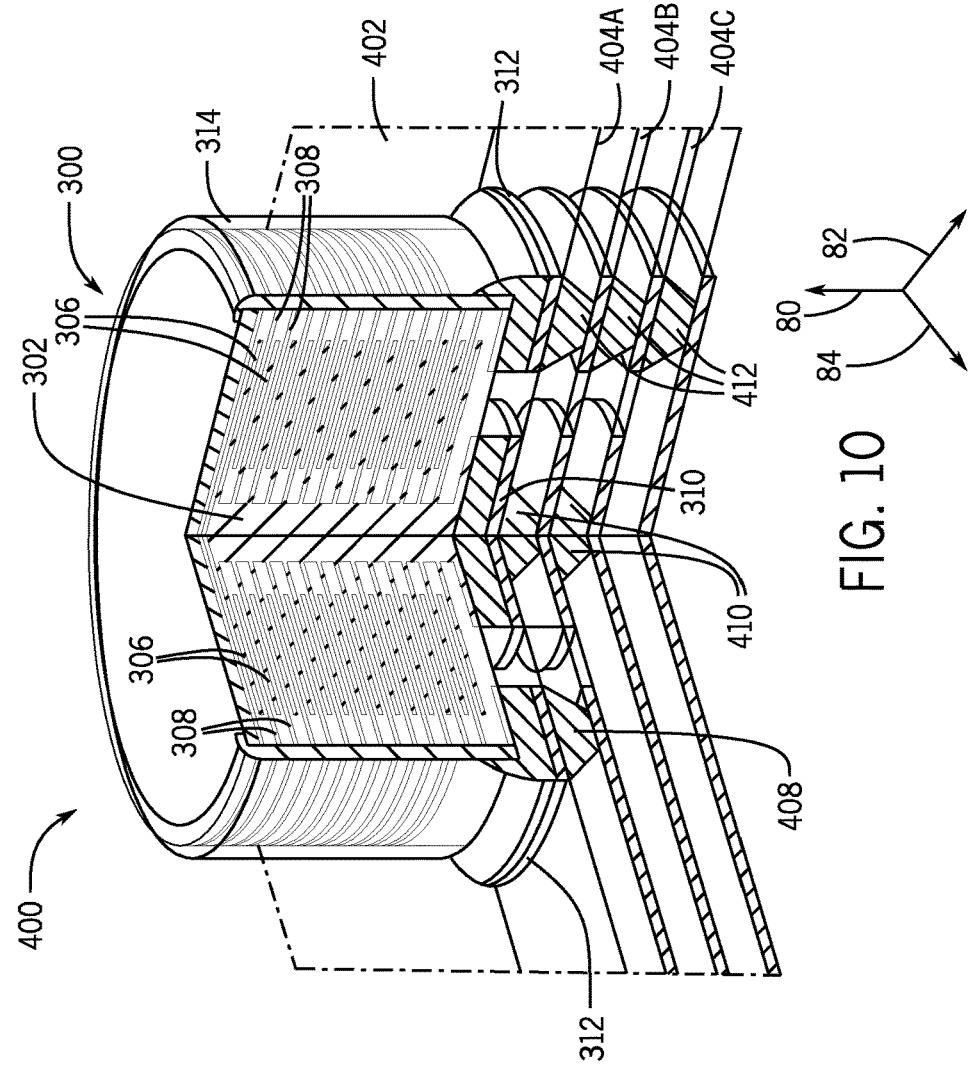
FIG. 10 is a diagram of a coupling between the cylindrical, self-shielding, coaxial capacitor structure of FIG. 9 and a printed circuit board of an electrical device, in accordance with an embodiment.

In order to illustrate a manner to couple the capacitor 300 to a PCB, FIG. 10 provides an illustration 400 of capacitor 300 mounted to a multilayer PCB 402. The multilayer PCB 402 in this example may has at least three layers 404A, 404B, and 404C. The terminal 310 is resistively coupled to the inner electrodes 306 through central pillar 302. Moreover, terminal 310 is also coupled through an electrical connection 410 in second layer 404B of the multilayer PCB 402. The external casing 314, which is directly connected to the outer electrodes 308 of capacitor 300, is resistively coupled to a terminal 312. The terminal 312, in turn, is resistively coupled to a first layer 404A of the multilayer PCB 402 through an electrical connection 408. Furthermore, terminal 312 is also resistively coupled to a third layer 404C of the multilayer PCB 402 through an electrical connection 412. Note that electrical connection 410 may include a via that goes through electrical layer 404A, and that connection 410 may be electrically isolated from connection 408 and from connection 412.

This above described and illustrated configuration prevents a direct shorting between terminals 310 and 312, which might otherwise prevent proper functioning of the capacitor 300. The type of terminations and connections in illustration 400 allow for a connection of a multilayer PCB 402 with an electrical device, such as capacitor 300, wherein one of the terminals of the capacitor 300 (e.g., terminal 312) completely circumscribes the second terminal (e.g., terminal 310). In a coaxial capacitor such as capacitor 300, the specific geometry of terminal 312, as discussed above, may improve the performance of the capacitor 300 as it extends self-shielding properties of capacitor 300 into the multilayer PCB 402.

Figure 11:
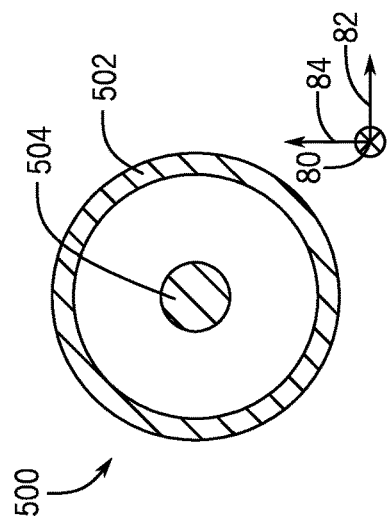
FIG. 11 is a diagram of the termination of the cylindrical, self-shielding coaxial capacitor structure of the capacitor of FIG. 10, in accordance with an embodiment.

While the geometry of the terminations discussed above may be useful in the design of coaxial capacitors, it should be understood that other devices, for example, conventional capacitors, inductors, diodes and other two-terminal electrical devices, may benefit from the use of similar designed electrical terminations. For example, FIG. 11 illustrates a bottom view of a termination 500 for an electrical device which may have two electrical connections that are connected to a PCB in a manner analogous to that described above in conjunction with the capacitor 300. An outer terminal 502 is disposed along an edge of the bottom of the electrical device and a central terminal 504 is disposed in a center of the bottom. In the illustrated example, outer terminal 502 and inner terminal 504 are concentric. Note that the termination 500 to couple a two-terminal electrical device to be appropriate for multilayer PCBs, in order to avoid a short between outer terminal 502 and inner terminal 504.

Figure 12:
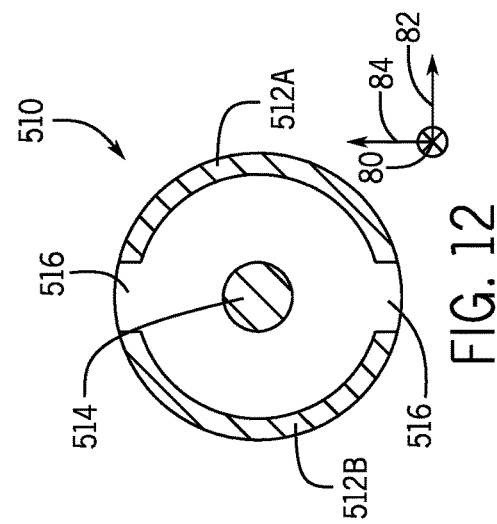
FIG. 12 is a diagram of an alternative termination for a cylindrical, self-shielding coaxial capacitor structure, in accordance with an embodiment.

The termination 510 illustrated in FIG. 12 illustrates another type of electrical termination that may be used for coaxial capacitor, as well as for other electrical devices (e.g., conventional capacitors, inductors, diodes, and other two-terminal electrical devices). In the illustrated design, the outer terminal may include non-contiguous terminations 512A and 512B, disposed along an edge of the bottom of the electrical device. A central terminal 514 is disposed in the center of the bottom of the electrical device. As illustrated, a broken disk is formed by terminations 512A and 512B, while the disc formed by central terminal 514 is concentric. Moreover, while termination 510 may be used in the coupling of a capacitor (e.g., capacitor 300) to a multilayer PCB board (e.g., multilayer PCB 402) in a manner similar to that illustrated in FIG. 10, the gaps 516 between termination 512A and 512B may provide for a coupling between the electrical device and a single layer of the printed circuit board based on a footprint of the single layer, as will be described below in greater detail with respect to FIG. 18.

The above described sections described cylindrical capacitor embodiments. It is possible to design coaxial self-shielding capacitors that may have different geometries, based on, for example, requirements and/or configurations of the circuitry in which the capacitors are to be utilized. One such geometry is illustrated in FIGS. 13A-13D, which illustrates an example of capacitor 600 having a squircle shape, i.e. a square with rounded edges. As illustrated, the capacitor 600 may have an external casing 602 that may be coupled to a first outer terminal 604. A second inner terminal 606 may be coupled to inner pillar 608. To form the capacitive interfaces of capacitor 600, a set of outer electrodes 610 may be capacitively coupled to inner electrodes 612 through dielectric 614. The inner electrodes 612 may be resistively coupled to terminal 606 and the outer electrodes 610 may be coupled to terminal 604. The capacitor 600 may be functionally described as a the circuit going from terminal 604 to terminal 606 through outer electrodes 610, inner electrodes 612, and the capacitive interfaces formed in dielectric 614. As illustrated, the inner electrodes 612 and the outer electrodes 610 may be substantially in shape of a squircle whereby the outer electrodes 610 and the inner electrodes 612 are substantially concentric with the inner pillar 608, forming a coaxial capacitor as capacitor 600. As detailed below, this geometry provides properties similar to those described above with respect to capacitor 300, such as self-shielding, a high Q factor, low fringe losses, etc. that result from the substantial containment of the electrical and the magnetic fields within a single dielectric 614.

Figure 14:
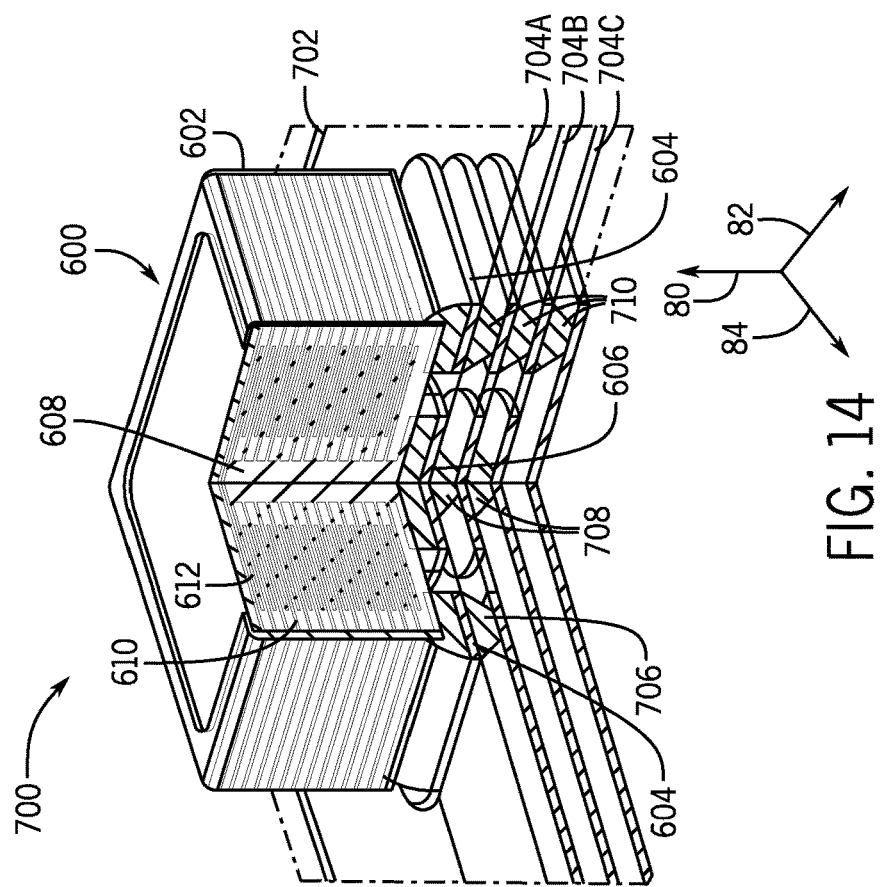
FIG. 14 is a diagram of a coupling between the prismatic, self-shielding coaxial capacitor structure of FIG. 13, and a printed circuit board of an electronic device of any of FIGS. 1-6, in accordance with an embodiment.

To illustrate a manner to couple the capacitor 600 to a multilayer PCB, FIG. 14 provides an illustration 700 of capacitor 600 mounted to a multilayer PCB 702. The multilayer PCB 702 may be formed by layers 704A, 704B, and 704C. In this example, terminal 606, which is resistively coupled to inner electrodes 612 via central pillar 608, is also coupled through an electrical connection 708 to a second layer 704B. Furthermore, terminal 604, resistively coupled to outer electrodes 610 through external casing 602, is coupled through an electrical connection 706 to the first layer 704A of PCB 702. Terminal 604 may also be coupled to the third layer 704C of the PCB through and electrical connection 710. Note that electrical connection 708 may include a via that goes through electrical layer 704A to be coupled to the second layer 704 of the PCB, and that connection 708 may be electrically isolated from connection 706 and from connection 710. This configuration described above may prevent direct shorting between terminals 604 and 606, which may prevent proper function of capacitor 600.

Figure 15:
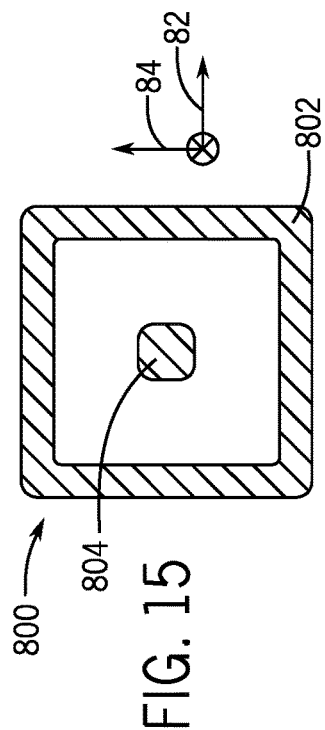
FIG. 15 is a diagram of the termination of the prismatic, self-shielding coaxial capacitor structure of FIG. 13, in accordance with an embodiment.

As discussed above, with respect to circular coaxial capacitors, the geometry of the terminations of capacitor such as capacitor 600 may be useful in the design of other electrical devices, such as conventional capacitors, inductors, diodes, and other two-terminal electrical devices. For example, FIG. 15 illustrates a bottom view of a termination 800 for an electrical device which may have two electrical connections that are connected to a PCB, such as capacitor 600 previously described. In some embodiments, the bottom of the casing may have the shape of square or a squircle. An outer terminal 802 is disposed along an edge of the bottom of the electrical device and a central terminal 804 is disposed in a center of the bottom. In this example, outer terminal 802 and inner terminal 804 are concentric. Note that the termination 800 to couple a two-terminal electrical device may be appropriate for multilayer PCBs, to avoid a short between outer terminal 802 and inner terminal 804.

Figure 16:
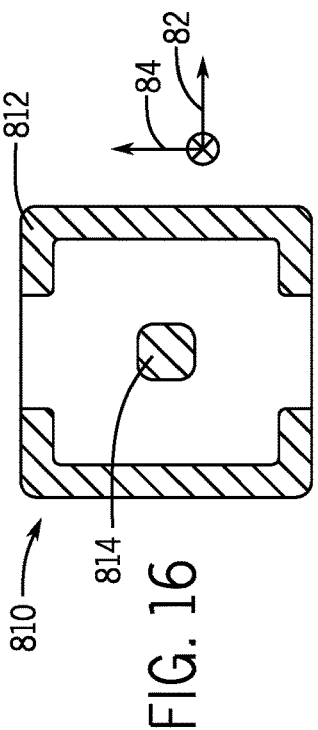
FIG. 16 is a diagram of an alternative termination for a prismatic, self-shielding coaxial capacitor structure of FIG. 13, in accordance with an embodiment.

The termination 810 illustrated in FIG. 16 illustrates an alternative type of electrical termination that may bused for a coaxial capacitor, and for other two-terminal electrical devices. The bottom view of termination 810 illustrated in FIG. 16 presents an outer terminal that includes two non-contiguous conductors 812A and 812B and a second terminal 814. The non-contiguous conductors 812A and 812B may be a broken section of a squircle. The termination 810 may be employed in a connection of a capacitor to a multilayer circuit board, such as the connection illustrated in FIG. 14. The termination may also be used in a connection with a single layer board, as will be described in greater detail below with respect to FIG. 18.

Figure 17:
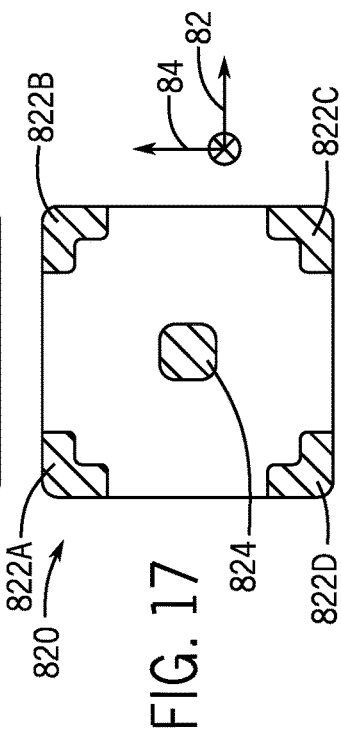
FIG. 17 is a diagram of another alternative termination for a prismatic, self-shielding coaxial capacitor structure of FIG. 13, in accordance with an embodiment.

Another embodiment for a termination 820 is illustrated in FIG. 17. A bottom of the capacitor may have an outer terminal with four non-contiguous conductors 822A, 822B, 822C, and 822D and a second terminal 824. The non-contiguous conductors 822A-D may be broken sections of a squircle. As discussed with respect to termination 810 of FIG. 16, the termination 820 of FIG. 17 may be used both to coupling with a multilayer circuit board as well as with a single layer board. It should be noted that, the examples of terminations illustrated in FIGS. 15-17 are not an exhaustive list of possible terminations for a coaxial capacitors described herein, and other termination designs used by coaxial capacitors are contemplated.

Figure 18:
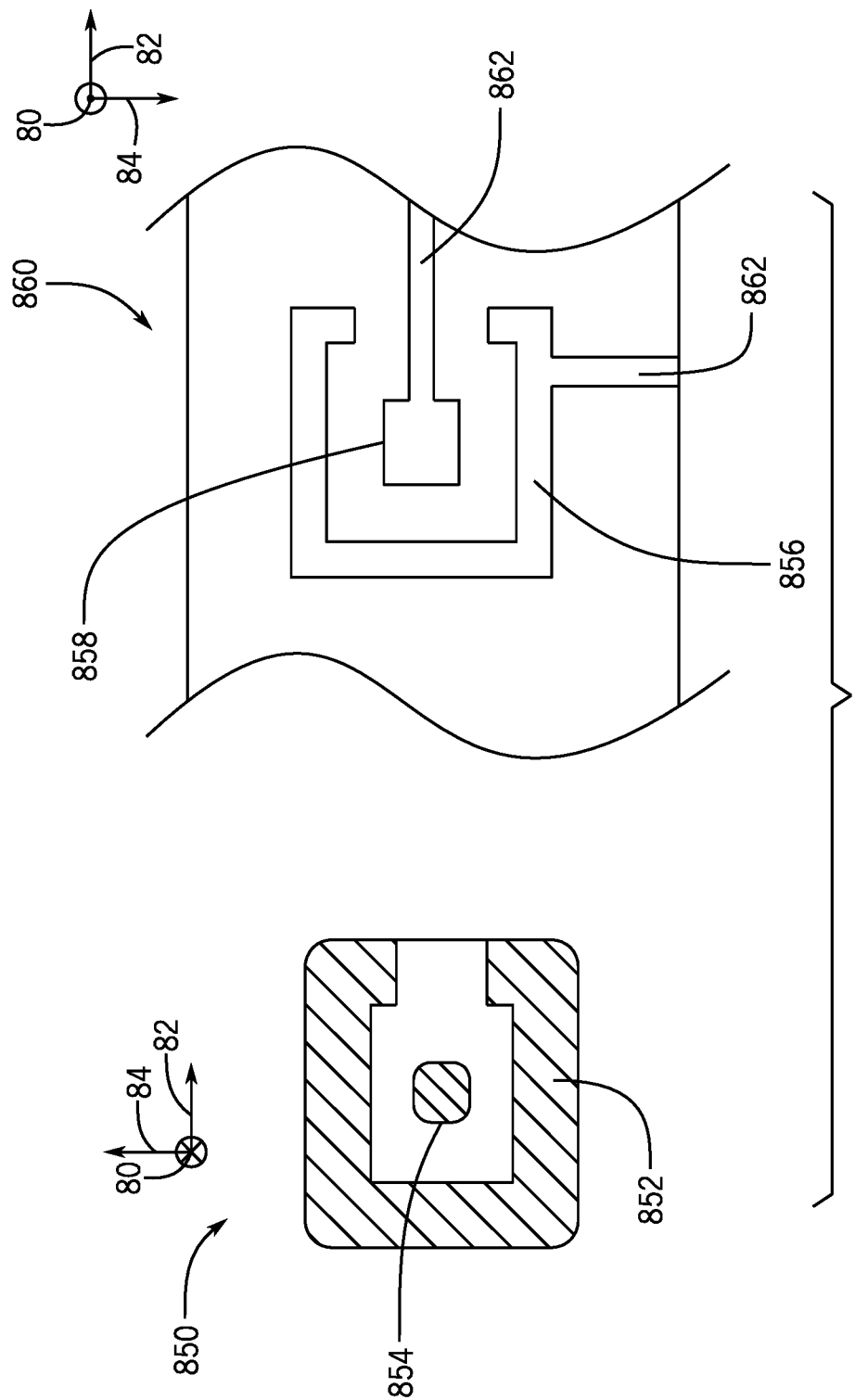
FIG. 18 presents a diagram of a termination for a prismatic, self-shielding coaxial capacitor structure of FIG. 13 and a corresponding printed circuit board (PCB) footprint that facilitates adequate coupling between the capacitor and the PCB, in accordance with an embodiment.

Moreover, the specific termination design may be facilitated by a matching footprint in a circuit layer that will be coupled. For example, FIG. 18 illustrates a design of a possible termination 850 for a coaxial capacitor, with a C-shaped outer terminal 852 and an inner terminal 854. The capacitor may be coupled to a single layer PCB with a footprint 860 that matches termination 850. The footprint 860 may include a central pad 858 that may be connected to inner terminal 854, and an outer pad 856 that may be connected to outer terminal 852 during the coupling. A circuit path 862 that connects to the outer pad 856 may be implemented in the same layer as footprint 860. Similarly, a circuit path 862 that connects to inner pad 858 may also be implemented in the same layer as footprint 860 through the gap in outer pad 858. Moreover, the gap in outer terminal 852 may further prevent an unintended short formed between circuit path 862 and outer pad 858.

Figure 19:
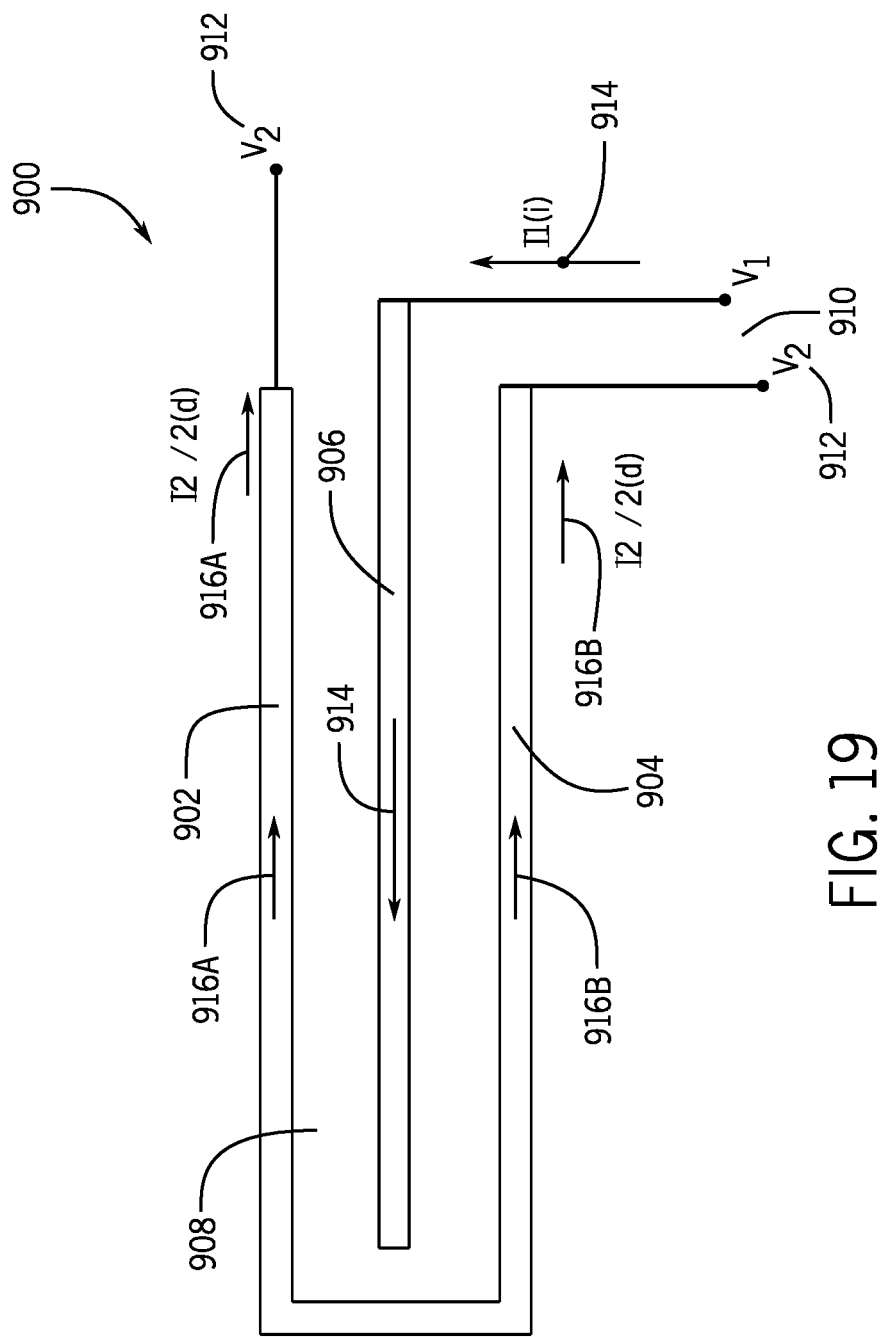
FIG. 19 is a schematic diagram of a capacitor structure presenting mutual inductance cancelation that may be used in conjunction with any of the devices of FIGS. 1-6, in accordance with an embodiment.

In certain capacitor designs the current flowing in the surface of the electrodes due to changes in the voltage applied to the capacitor may generate mutual inductances between the electrodes. In certain designs, the mutual inductances between electrode surfaces may lead decrease in the performance of the capacitors from undesired energy losses. FIG. 19 illustrates an embodiment of a capacitor 900 that may be used to mitigate the mutual inductances by adjusting an orientation of the flow of currents in the electrodes. Capacitor 900 includes outer electrodes 902 and 904 and an inner electrode 906, separated by dielectric 908. Capacitor 900 may be coupled to a circuit via terminals 910 and 912. Terminal 910 is coupled to the inner electrode 906 whereas terminal 912 is coupled to outer electrodes 902 and 904. In this example, a voltage V1 applied to terminal 910 and a second voltage V2 smaller than V1 is applied to terminal 912. As a result, an electrical current 914 flows into electrode 906 and electrical currents 916A and 916B flow out of electrodes 902 and 904 respectively. Note that in this example the value of current 914 is twice as large as currents 916A and 916B. Due to the position of terminals 910 and 912 relative to inner electrode 906 and outer electrodes 902 and 904, the current 914 may flow in an anti-parallel direction relative to currents 916A and 916B. The anti-parallel flow of the current 914 and currents 916A and 916B may lead to a cancellation of the mutual inductances generated by the flow of the currents 914, 916A, and 916B in the surface of the electrodes 902, 904, and 906, which may improve the performance of the capacitor by reducing parasitic inductances and capacitances of capacitor 900.

FIGS. 20A-C include diagrams of a coaxial multilayer capacitor 950 having reduced mutual inductances therein. The capacitor 950 includes a set of outer electrode layers inclusive of outer electrodes 952 and a set of inner electrodes layers inclusive of inner electrodes 954. Each outer electrode 952 includes two non-contiguous sections, each section including a connector lip 956. The connector lips 956 of all outer electrodes 952 may be coupled to a first terminal of capacitor 950, described below. Each inner electrode 954 is coupled to a central pillar 958 that is coupled to a second terminal of capacitor 950.

In order to illustrate the reduced mutual inductances obtained in capacitor 950, diagrams 970 and 974 of FIG. 21 provide a schematic view of the electrodes 952 and 954 of capacitor 950, illustrated separately, and the flow of currents 972 and 976 that may be observed during operation of capacitor 950. In the illustrated example, a first voltage is applied to a first terminal coupled to the central pillar 958 and a second voltage, smaller than the first voltage, is applied to a second terminal coupled to connector lips 956. Diagram 970 illustrates the flow of currents 972 through inner electrodes 954 and diagram 974 illustrates the flow of currents 976 through outer electrodes 952. As illustrated, currents 972 and currents 976 have anti-parallel orientations. As a result, capacitor 950 may present a cancellation of mutual inductances generated by the flow of currents 972 and 976. Moreover, the anti-parallel orientation of electrical currents 972 and 976 may be obtained based on the location of the outer electrode termination 956 relative to the plates of the electrodes 952 and 954 and to central pillar 958. Each inner electrode 954 is coupled to its respective terminal through the central pillar 958 and each outer electrode 952 is coupled to its respective terminal through a connector lip 965.

Figure 22:
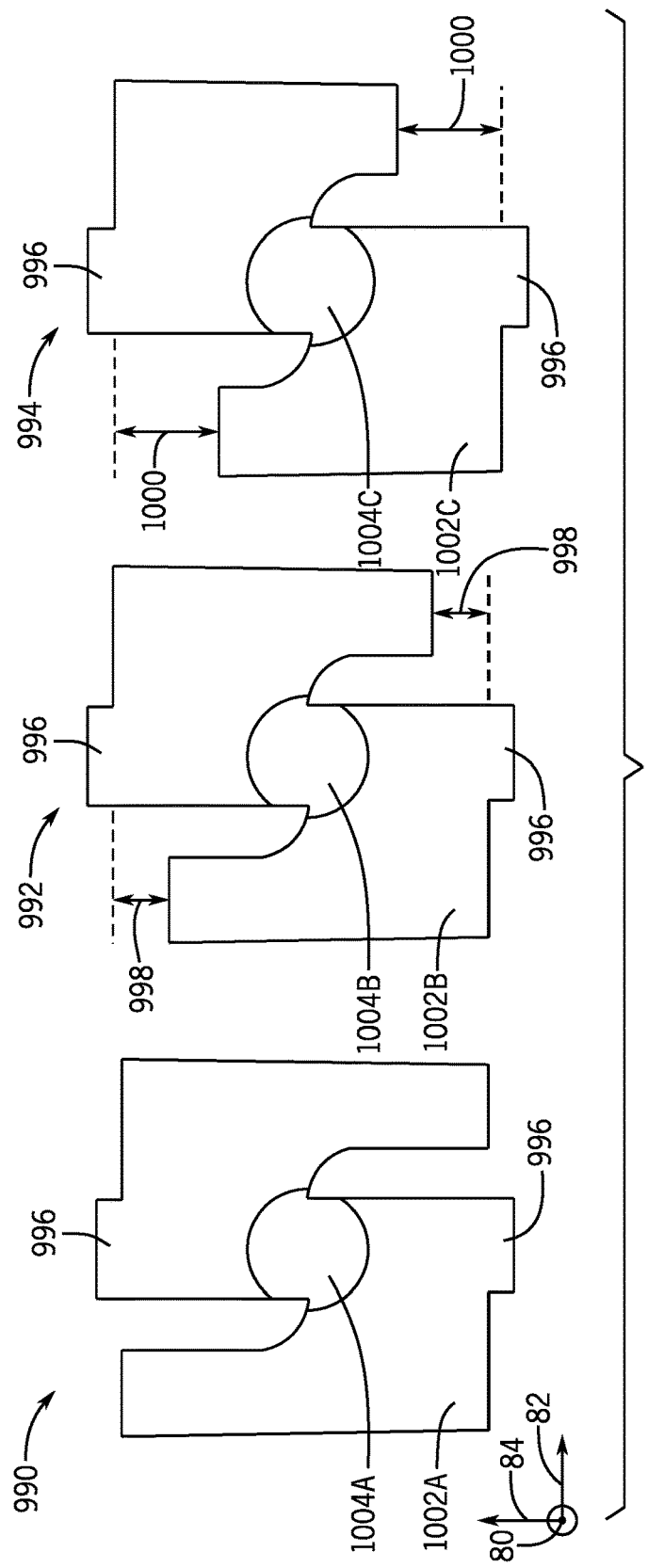
FIG. 22 presents diagrams that illustrate a method to adjust a capacitance of the multilayer, coaxial, self-shielding capacitor structure of FIG. 20 based on a change in geometric dimensions, in accordance with an embodiment.
Figure 23F:
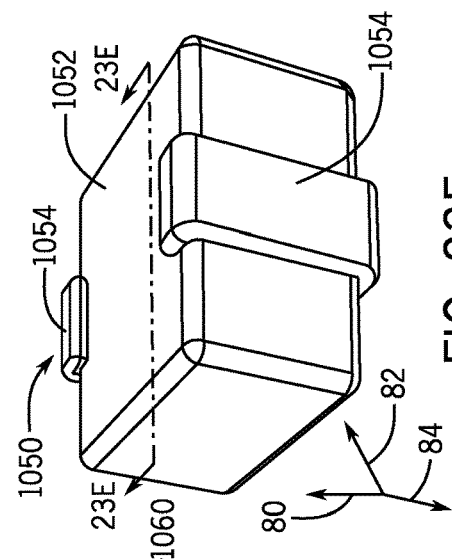
Figure 23I:
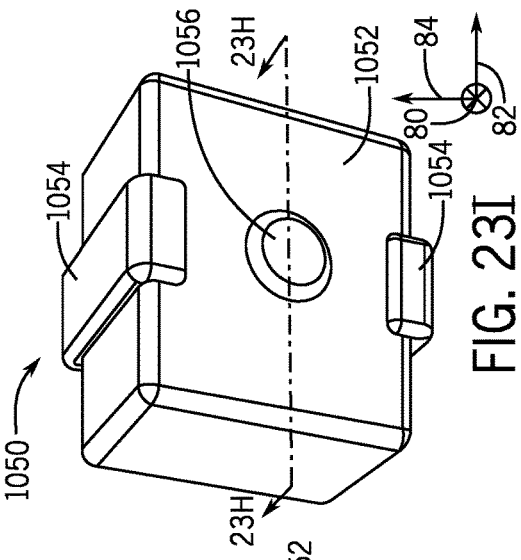
Figure 23E:
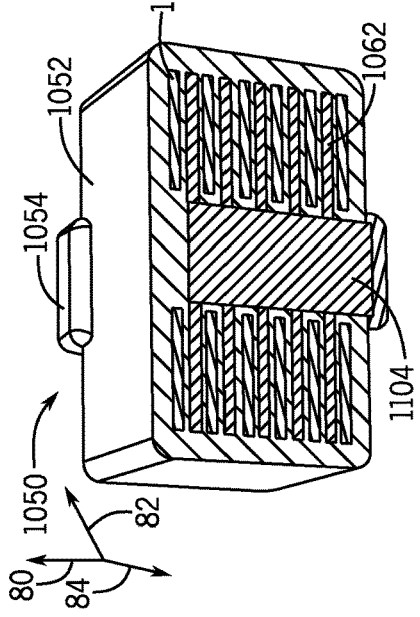
Figure 23H:
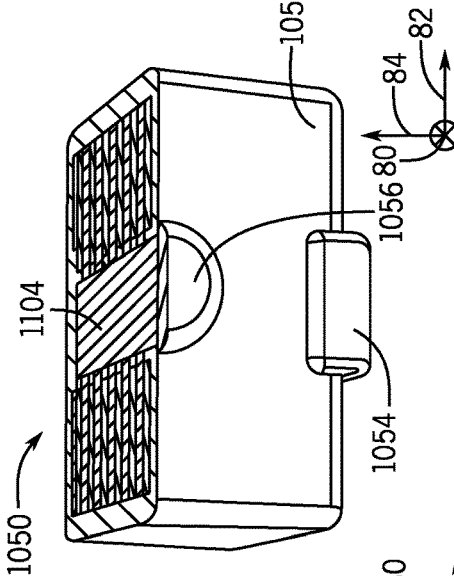
Figure 23D:
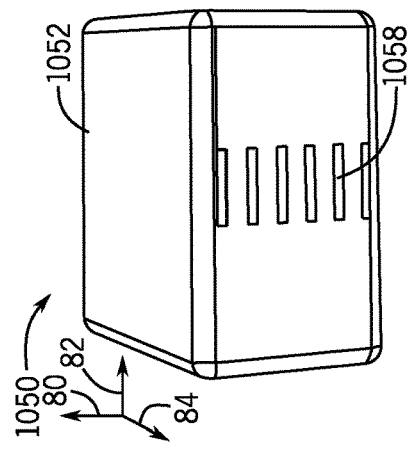
Figure 23G:
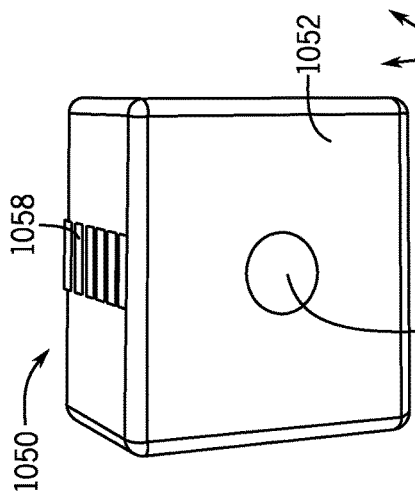

The value of the capacitance of capacitor 950 may be adjusted based on a change in the dimension of the inner electrodes 954. The diagrams 990, 992, and 994 of FIG. 22 illustrate top views of coaxial multilayer capacitors, which may be similar to capacitor 950. Each of the capacitors shown has an outer electrode layer 1002, which is coupled to its respective layer through connector lips 996, and inner electrode layer 1004 coupled to a central pillar (not shown). The capacitor of diagram 990 has a capacitance which is larger than the one illustrated in diagram 992. In turn, the capacitor illustrated in diagram 992 has a capacitance which is larger than the capacitor of diagram 994. This result may be obtained by adjusting the dimensions of each inner electrode layer 1004. Note that the capacitor illustrated in diagram 990 has electrodes 1002A and 1004A with a larger surface area than the electrodes 1002B and 1004B illustrated in diagram 992, as a result of the length difference 998. Similarly, the capacitor illustrated in diagram 992 has electrodes 1002B and 1004B with a larger surface area than the electrodes 1002C and 1004C of the capacitor illustrated in diagram 990, as a result of the length difference 1000. The smaller area of the electrodes may be filled by a dielectric material or any other casing material. Note that the presence of the connecting lips 996 may provide flexibility in choosing the dimension of the areas of coaxial capacitor.

The views shown in FIGS. 23A-I illustrate a coaxial capacitor 1050 similar to capacitor 950 of FIGS. 21A-C with an insulating casing 1052 and terminations 1054 and 1056. As seen in exploded view in FIG. 23C, capacitor 1050 may have outer electrodes 1060 and inner electrodes 1062. Each outer electrode 1060 may have a connector lip 1064 which may pass through a slot 1058 in the insulating casing 1052 and physically connect to terminations 1054 located in the sides of the capacitor 1050. The inner electrodes 1062 may be coupled through a central pillar 1104 (as illustrated in cross-sectional FIGS. 23E and 23H) to a second termination 1056 in the bottom of the capacitor 1050.

While we discussed capacitors with a squircle footprint, such as capacitor 1050, capacitors with a rectangular footprint (i.e., the shape of the bottom of the capacitor 1200 is that of a rectangle), such as the coaxial capacitor 1200 illustrated in FIGS. 24A-C may also be fabricated. The capacitor 1200 may be constructed in a manner similar to capacitor 1050. The capacitor 1200 has an external casing 1202 and side terminals 1204 in FIG. 24A. As seen in bottom view of FIG. 24B, the capacitor may have a bottom terminal 1206. The exploded view of capacitor 1200 show in FIG. 24C illustrates the internal structure which may include outer electrodes 1208 and inner electrodes 1210. Outer electrodes 1208 may include a connector lip 1212 which may couple to side terminals 1204 through slots 1214 in casing 1202. The inner electrodes 1210 may be coupled via a central pillar (not shown) to bottom terminal 1206. In some implementations, the location of the connector lips 1212 relative to the bottom terminal 1206 may generate antiparallel current flows in the surface of inner electrodes 1210 and outer electrodes 1208, as discussed above. The resulting cancellation of the mutual inductances generated by the flow of currents may lead to an improved performance of capacitor 1200, by mitigating parasitic capacitance and parasitic inductance.

The central pillars of the capacitors described may be cylindrical such as central pillar 302 of FIG. 10 and central pillar 958 of FIGS. 20A-C. In some embodiments, the central pillar may be a prism in a square shape such as the capacitor 1248 illustrated in FIG. 25. The top view provides an illustration of a coaxial capacitor 1248 with cancelling mutual inductances. Capacitor 1248 may be built in a manner similar to capacitor 950. In capacitor 1248, the shape of outer electrode 1250 is such that the central region of the inner electrode 1252 may be more similar to a square than a circle, as in capacitor 950. As a result, the central pillar of capacitor 1248 may be a prism, in contrast with the central pillar of capacitor 950 which may be a cylinder, which may lead to an easier assembly process.

The capacitors discussed above have uniformly shaped electrodes. By contrast, capacitor 1300 illustrated in FIGS. 26A and 26B is an example of a capacitor 1300 in which the inner electrodes 1304A, 1304B, and 1304C may have different dimensions from one another. Similarly, the corresponding outer electrodes 1302A, 1302B, and 1302C may also have different dimensions from one another while, for example, corresponding to the respective dimensions of inner electrodes 1304A, 1304B, and 1304C. The outer electrode layers 1302 may also include connecting lips 1306 which are aligned for proper coupling with a terminal, in a manner similar to that described above with respect to capacitor 1050. The change in the dimensions of the layers of the inner electrodes 1304A, 1304B, and 1304C and the outer electrodes 1302A, 1302B, and 1302C (taken together as a stack) offer a more flexible method to decrease a capacitance of the capacitor 1300 when compared to the reduction of areas illustrated in FIG. 22.

Several of the embodiments illustrated above may be implemented as multilayer ceramic capacitors. The flow diagram 1400 in FIG. 27 illustrates a method that may be used to manufacture coaxial capacitors such as the coaxial multilayer ceramic capacitors described herein. The method may employ a process 1402 to manufacture electrode layers.

A layer that includes outer electrodes may be produced from a green sheet 1406. Drilling of a cavity in the green sheet 1406 and filling of the cavity with a conductive material to form a central conductor 1412 in green sheet 1406 may be accomplished in step 1408 to generate a resultant filled green sheet 1410. In step 1414, a region of the surface of the resultant filled green sheet 1410 may be stenciled with a conductive material to form an outer electrode 1418, separated from the central conductor 1412 by an uncovered insulating region 1416 as an outer electrode green sheet 1420.

Similarly, a layer that includes inner electrode may also be produced from a green sheet 1406. In step 1432, which may be similar to process step 1408 described above, a cavity may be drilled in green sheet 1430 and the cavity may be filled with a conductive material to form a central conductor 1434 in the resultant filled green sheet 1436. The central pillar 1434 may be disposed in a location of the green sheet 1436 similar to the location of central pillar 1412 in green sheet 1410. This geometrical alignment may be useful while forming a central pillar 1462 in the stacking, as detailed below. In step 1437, a region of the surface of the resultant filled green sheet 1436 may be stenciled with a conductive material to form an inner electrode 1438 as an inner electrode green sheet 1442. The inner electrode 1438 is physically connected to the central conductor 1412. Inner Electrode green sheet 1442 may also have an uncovered insulating region 1440 in the boundary thereof.

Green sheets containing outer electrodes, such as outer electrode green sheet 1420, may be stacked on top of a green sheets containing inner electrodes, such as inner electrode green sheet 1442. This stacking may be repeated multiple times (in step 1450), preserving an alignment of the central conductor 1412 and 1434 of the two types of electrode green sheets 1420 and 1442. A top cover green sheet 1444 and a shielding layer 1446 may subsequently be placed (in step 1451) on top of the stack of electrode green sheets 1420 and 1442 produced in step 1450. Similarly, a bottom cover layer 1448 may be placed (in step 1452) in the bottom of the stack of electrode green sheets 1420 and 1442 produced in step 1450.

The stacking through steps 1450, 1451, and 1452 may form the multilayer capacitor 1460. The central conductors 1412 and 1434 of the multiple conductive green sheets 1420 and 1442 may form the central pillar 1462. The stenciled regions 1418 of electrode green sheets 1420 containing the outer electrodes may form outer electrodes 1468. The stenciled regions 1434 of electrode green sheets 1442 containing the inner electrodes may form inner electrodes 1466. The uncovered regions 1416 and 1440 of the electrode green sheets 1420 and 1442 may become the dielectric of the capacitor 1464. The capacitor 1460 may have a casing with conductive terminals that may physically connect to the outer electrodes 1468. Moreover, a cavity may be drilled in the bottom cover layer 1448 to provide access of a terminal to the central pillar 1462. Additionally, the steps and method described herein with respect to FIG. 27 be used and/or modified as necessary to fabricate any of the capacitors described herein, such as capacitors 300, 600, 950, 990, 992, 994, 1050, 1200, 1248, and 1300.

Capacitors 300, 600, 950, 990, 992, 994, 1050, 1200, 1248, and 1300 illustrated above may be fabricated according to maximum voltage rating specifications. Capacitors such as the capacitors described herein may have a maximum rated voltage ranging from 1 mV to 10 kV. Moreover may be fabricated according to capacitance specifications that may range from 10 pF to 1 mF. Note also that capacitors described herein may be class 1 capacitors, class 2 capacitors or class 3 capacitors.

Technical advantages of the embodiments presented herein include but are not limited to multilayer capacitors presenting high Q factor, reduced fringing effect losses, and reduced parasitic capacitances and/or inductances. Moreover, the coaxial capacitor embodiments described herein may improve the relationship between the electric and the magnetic fields generated within the dielectric medium, as they become similar to the relationship of electrical and magnetic fields found in coaxial type transmission lines. This coaxial type transmission line model within the capacitor may provide self-shielding characteristics to the capacitor, mitigating interactions between the electric and/or magnetic fields of the capacitor and that of neighboring devices. The shielding property may be further extended down to a multilayer PCB by utilizing capacitors with terminations such as terminations 500 and 800, which may extend the coaxial transmission line to the layers of the PCB.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A capacitor, comprising:
    a first set of layers, each layer of the first set of layers comprising an outer electrode having a first shape, wherein the first shape is non-contiguous and comprises a first portion and a second portion, and each outer electrode is coupled to a first terminal of the capacitor; and
    a second layer interposed between two layers of the first set of layers, wherein the second layer comprises an inner electrode having a second shape, wherein the inner electrode is coupled to an inner conductor, wherein the second shape and the inner conductor form a contiguous shape that is aligned with the first shape, and wherein the inner conductor is coupled to a second terminal of the capacitor;
    wherein the first shape of each outer electrode of the two layers of the first set of layers and the second shape of the inner electrode of the second layer are coaxially arranged to generate a first flow of electrical currents in each outer electrode that is anti-parallel to a second flow of electrical currents in the inner electrode upon an application of a voltage between the first terminal and the second terminal.

2. The capacitor of claim 1, wherein the first terminal comprises a contiguous conductor disposed along a bottom of the capacitor and configured to be coupled to a first layer of a multilayer circuit board, and wherein the second terminal comprises a pin disposed in the bottom of the capacitor and configured to be coupled to a second layer of the multilayer circuit board distinct from the first layer of the multilayer circuit board.

3. The capacitor of claim 1, wherein the first terminal comprises a non-contiguous conductor disposed along a bottom of the capacitor and configured to be coupled to a first layer of a circuit board, and wherein the second terminal comprises a pin disposed in the bottom of the capacitor and configured to be coupled to the first layer of the circuit board.

4. The capacitor of claim 3, wherein the non-contiguous conductor comprises a C-shaped metallic termination.

5. The capacitor of claim 3, wherein the non-contiguous conductor comprises two terminations along the bottom of the capacitor or at distinct locations of the bottom of the capacitor.

6. The capacitor of claim 1, wherein a maximum rated voltage of the capacitor is approximately between 4V and 50V.

7. The capacitor of claim 1, wherein the inner electrode comprises copper, nickel, silver, a copper alloy, a nickel alloy, or a silver alloy, or any combination thereof.

8. The capacitor of claim 1, wherein the rated capacitance of the capacitor is approximately between 0.2 pF and 200 pF when the capacitor comprises a class 1 capacitor, wherein the rated capacitance of the capacitor is approximately between 0.47 µF to 47 µF for when the capacitor comprises a class 2 capacitor.

9. The capacitor of claim 1, wherein the capacitor comprises a multi-layer ceramic capacitor having a stable ceramic material, an ultra-stable ceramic material, or any combination thereof as a dielectric therein.

10. A capacitor, comprising:
    a layered stack of electrodes;
    a first terminal of the capacitor disposed in a first location of the capacitor and coupled to a first set of electrodes of the layered stack of electrodes, wherein each electrode of the first set of electrodes comprise a non-contiguous shape comprising a first and a second portion; and
    a second terminal of the capacitor disposed in a second location of the capacitor and coupled to a second set of electrodes of the layered stack of electrodes, wherein each electrode of the second set of electrodes comprise a contiguous shape aligned with the non-contiguous shape, and wherein upon application of a positive voltage between the first terminal of the capacitor and the second terminal of the capacitor, a first set of electrical currents flow from the first terminal of the capacitor into the first set of electrodes along the respective first and the second portions of the respective electrodes and a second set of electrical currents flow from each respective electrode of the second set of electrodes into the second terminal of the capacitor along the contiguous shape such that the flow of the first set of electrical currents is anti-parallel to the flow of the second set of electrical currents in predefined corresponding areas of the first set of electrodes and the second set electrodes based upon the first location of the first terminal of the capacitor and the second location of the second terminal of the capacitor.

11. The capacitor of claim 10, wherein the flow of the first set of electrical currents and the flow of the second set of electrical currents generate mutual inductances that cancel.

12. The capacitor of claim 10, wherein a dimension of each electrode of the first set of electrodes and a dimension of each electrode of the second set of electrodes is selected to create a specified capacitance of the capacitor.

13. The capacitor of claim 12, wherein the rated capacitance of the capacitor is approximately between 0.2 pF and 200 pF when the capacitor comprises a class 1 capacitor, wherein the rated capacitance of the capacitor is approximately between 0.47 µF to 47 µF for when the capacitor comprises a class 2 capacitor.

14. The capacitor of claim 10, wherein a vertical height of the capacitor is less than approximately 0.8 mm.

15. The capacitor of claim 10, wherein the first terminal of the capacitor comprises two conductive terminations located along two opposite sides of the capacitor, wherein a first width of each of the conductive terminations is substantially less than a second width of the capacitor along the two opposite sides of the capacitor; and wherein the second terminal of the capacitor comprises a second conductive termination along a bottom of the capacitor.

16. A method, comprising:
drilling a first aperture in a first ceramic sheet;
filling the aperture with a first conductive material to form a first portion of a central conductor;
stenciling the first ceramic sheet with a second conductive material to produce an outer electrode, physically isolated from the first portion of the central conductor, wherein the outer electrode comprises a first shape, wherein the first shape is non-contiguous;
drilling a second aperture in a second ceramic sheet;
filling the second aperture with the first conductive material to form a second portion of the central conductor;
stenciling the second ceramic sheet with the second conductive material to produce an inner electrode, physically connected to the second portion of the central conductor, wherein the inner electrode comprises a second shape, wherein the second shape and the second portion of the central conductor form a contiguous shape; and
stacking the first ceramic sheet and the second ceramic sheet to couple the first portion of the central conductor to the second portion of the central conductor wherein the first shape of the outer electrode of the first ceramic sheet is coaxially arranged with respect to the second shape of the inner electrode of the second ceramic sheet.

17. The method of claim 16, wherein stenciling the first ceramic sheet to produce the outer electrode comprises producing the outer electrode to have a center aligned with the first portion of the central conductor, wherein stenciling the second ceramic sheet to produce the inner electrode comprises producing the inner electrode to have a center aligned with the second portion of the central conductor.

18. The method of claim 16, wherein the first conductive material and the second conductive material comprise a common conductive material.

* * * * *